US006937023B2

(12) United States Patent
McElhinney

(10) Patent No.: US 6,937,023 B2
(45) Date of Patent: Aug. 30, 2005

(54) PASSIVE RANGING TECHNIQUES IN BOREHOLE SURVEYING

(75) Inventor: Graham McElhinney, Inverurie (GB)

(73) Assignee: PathFinder Energy Services, Inc., Houston, TX (US)

( * ) Notice: Subject to any disclaimer, the term of this patent is extended or adjusted under 35 U.S.C. 154(b) by 128 days.

(21) Appl. No.: 10/368,257

(22) Filed: Feb. 18, 2003

(65) Prior Publication Data

US 2004/0160223 A1 Aug. 19, 2004

(51) Int. Cl.[7] .............................. G01V 3/00; G01V 3/02; G01V 3/08; E21B 7/00
(52) U.S. Cl. ......................... 324/347; 324/346; 175/61
(58) Field of Search ................................ 324/346, 347; 175/73, 61; 33/304

(56) References Cited

U.S. PATENT DOCUMENTS

| | | | |
|---|---|---|---|
| 3,170,137 A | 2/1965 | Brandt | 340/853.1 |
| 3,725,777 A | 4/1973 | Robinson et al. | 324/346 |
| 4,302,886 A | 12/1981 | Starr | 33/312 |
| 4,909,336 A | 3/1990 | Brown et al. | 175/45 |
| 4,987,684 A | 1/1991 | Andreas et al. | 33/304 |

(Continued)

FOREIGN PATENT DOCUMENTS

| | | |
|---|---|---|
| EP | 0682269 A2 | 11/1995 |
| GB | 1585479 | 3/1981 |
| GB | 2086055 A | 5/1982 |
| GB | 2321970 A | 8/1998 |
| GB | 2331811 A | 6/1999 |
| WO | WO-0011316 | 3/2000 |

OTHER PUBLICATIONS

Berger, P.E. and Sele, R., "Improving Wellbore Position Accuracy of Horizontal Wells by Using A Continuous Inclination Measurement From A Near Bit Inclination MWD Sensor," 1998 Society of Petroleum Engineers Annual Technical Conference on Horizontal Well Technology held in Calgary, Alberta, Canada, Nov. 1–4, 1998, SPE 50378.

McElhinney, Graham and Sognnes, Roar, "Case Histories Demonstrate A New Method For Well Avoidance And Relief Well Drilling," 1997 Society of Petroleum Engineers, SPE/IADC 37667, Richardson, Texas, U.S.A.

McElhinney, G.A., Margeirsson, A., Hamlin, K., and Block, I., "Gravity MWD: A New Technique To Determine Your Well Path," 2000 IADC/SPE Drilling Conference, New Orleans, Louisiana, Feb. 23–25, 2000, IADC/SPE Paper No. 59200.

Marketing material MagTraC 06–03 by Scientific Drilling available for download at http://www.scientificdrilling.com/pdf/magtrac%20overview.pdf., no date.

*Primary Examiner*—N. Le
*Assistant Examiner*—John Teresinski

(57) ABSTRACT

A method for determining the location of a target subterranean structure from within an adjacent borehole is disclosed which uses first and second gravity measurement devices disposed at corresponding first and second positions in the adjacent borehole and a magnetic field measurement device disposed one of the first and second positions. The method includes processing a total local magnetic field, a reference magnetic field, and a local azimuth determined using the gravity measurement devices to determine a portion of the total magnetic field attributable to the subterranean structure multiple points in the adjacent borehole. The location of the subterranean structure is determined using the portion of the total magnetic field attributable thereto. A system adapted to execute the disclosed method and a computer system including computer-readable logic configured to instruct a processor to execute the disclosed method are also provided.

47 Claims, 8 Drawing Sheets

U.S. PATENT DOCUMENTS

| | | |
|---|---|---|
| 5,194,859 A | 3/1993 | Warren ................... 340/853.4 |
| 5,220,963 A | 6/1993 | Patton ......................... 175/24 |
| 5,259,466 A | 11/1993 | Venditto et al. ........... 175/4.51 |
| 5,351,755 A | 10/1994 | Howlett ................... 166/255.2 |
| 5,415,238 A | 5/1995 | Nice .......................... 166/381 |
| 5,419,405 A | 5/1995 | Patton ......................... 175/27 |
| 5,439,064 A | 8/1995 | Patton ......................... 175/24 |
| 5,512,830 A | 4/1996 | Kuckes ....................... 324/346 |
| 5,657,826 A | 8/1997 | Kuckes ......................... 175/45 |
| 5,675,488 A | 10/1997 | McEhlinney ................. 702/10 |
| 5,842,149 A | 11/1998 | Harrell et al. ................. 702/9 |
| 5,996,711 A | 12/1999 | Ohmer ......................... 175/61 |
| 6,003,599 A | 12/1999 | Huber et al. ............. 166/255.2 |
| 6,021,377 A | 2/2000 | Dubinsky et al. ............. 702/9 |
| 6,065,550 A | 5/2000 | Gardes ......................... 175/62 |
| 6,092,610 A | 7/2000 | Kosmala et al. .............. 175/61 |
| 6,145,378 A | 11/2000 | McRobbie et al. ............ 73/490 |
| 6,173,773 B1 | 1/2001 | Almaguer et al. ........ 166/255.2 |
| 6,192,748 B1 | 2/2001 | Miller .................... 73/157.01 |
| 6,233,524 B1 | 5/2001 | Harrell et al. ................. 702/9 |
| 6,267,185 B1 | 7/2001 | Mougel et al. ................ 175/57 |
| 6,296,066 B1 | 10/2001 | Terry et al. ................... 175/92 |
| 6,315,062 B1 | 11/2001 | Alft et al. ..................... 175/45 |
| 6,321,456 B1 | 11/2001 | McElhinnney ............... 33/304 |
| 6,453,239 B1 | 9/2002 | Shirasaka et al. ........... 701/220 |
| 6,470,976 B2 | 10/2002 | Alft et al. ..................... 175/61 |
| 6,480,119 B1 | 11/2002 | McElhinney ................ 340/853 |
| 2002/0005286 A1 | 1/2002 | Mazorow et al. ........ 166/255.3 |
| 2002/0005297 A1 | 1/2002 | Alft et al. ..................... 175/26 |
| 2002/0116130 A1 | 8/2002 | Estes et al. .................... 702/9 |
| 2002/0133958 A1 | 9/2002 | Noureldin et al. ............ 33/304 |
| 2002/0144417 A1 | 10/2002 | Russell et al. ................ 33/304 |

FIG. 1
FIG. 4
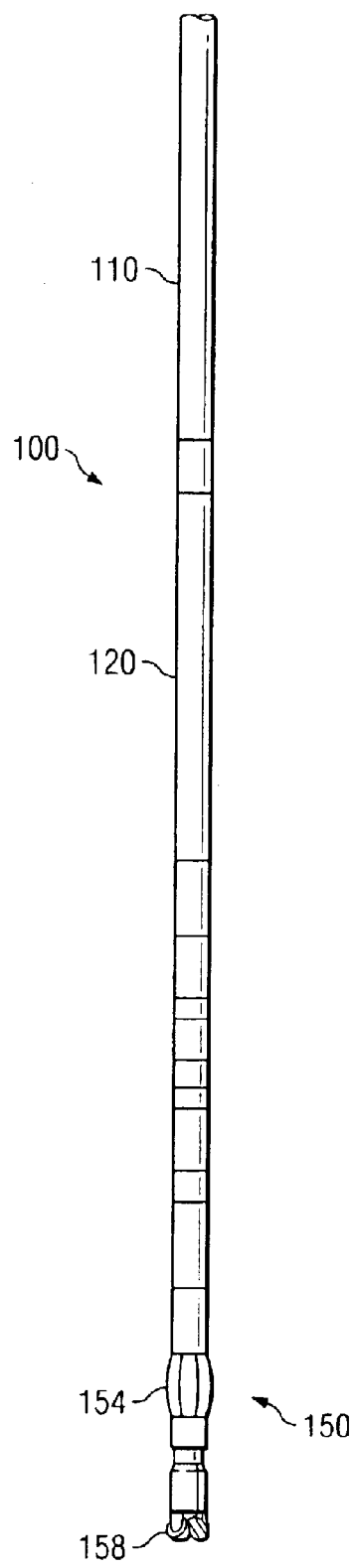
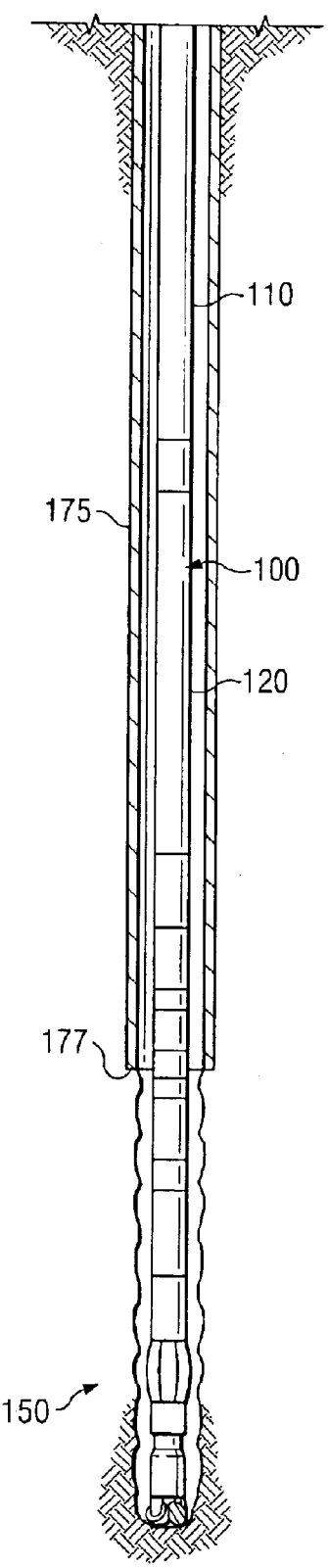

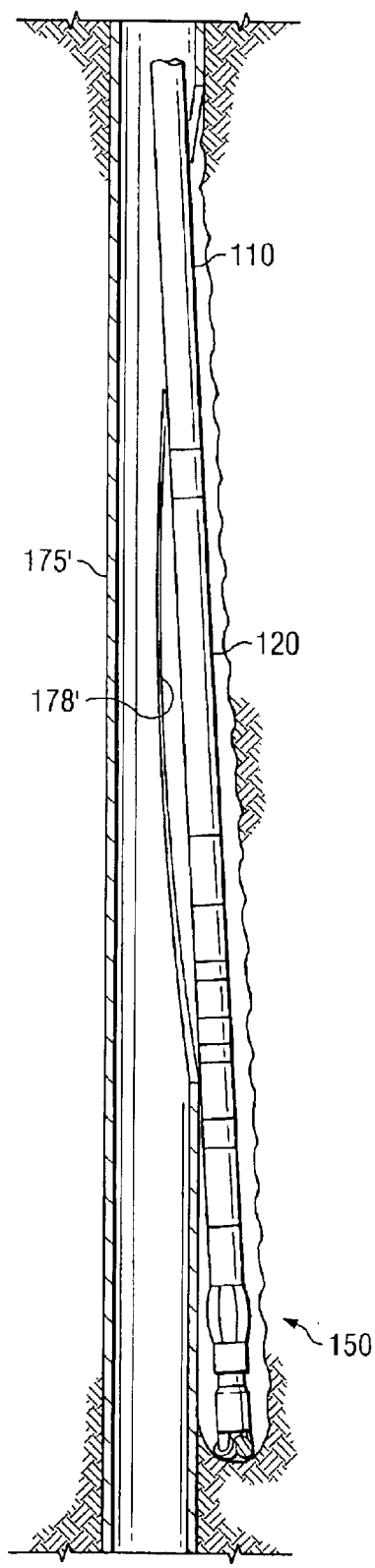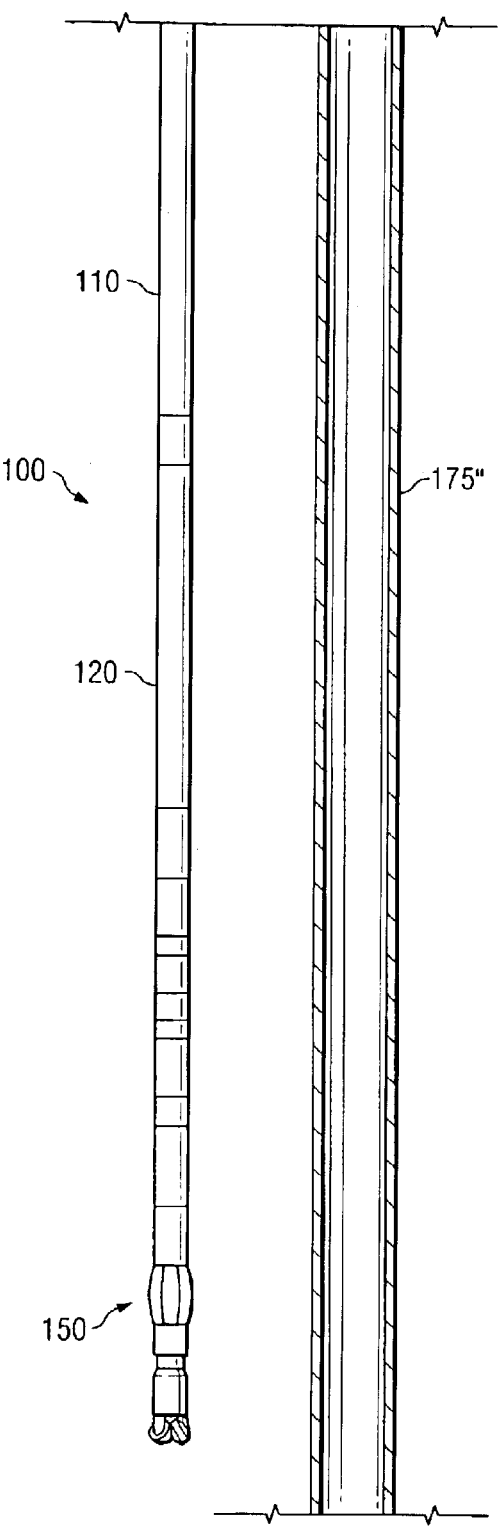

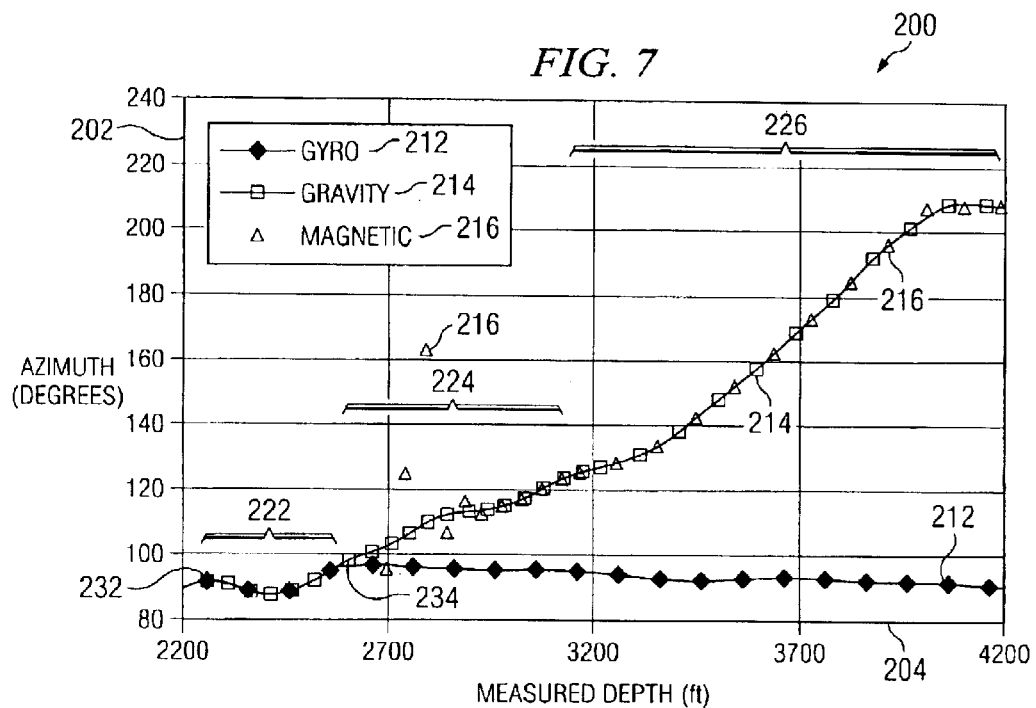
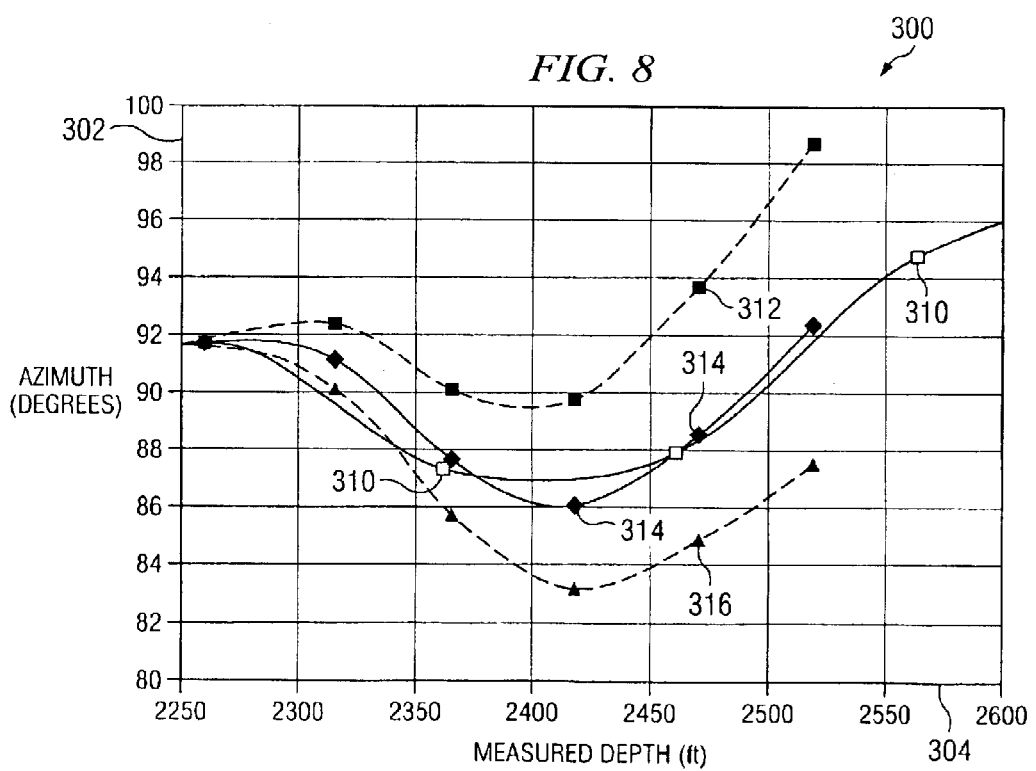

US 6,937,023 B2

PASSIVE RANGING TECHNIQUES IN BOREHOLE SURVEYING

RELATED APPLICATIONS

None.

FIELD OF THE INVENTION

The present invention relates generally to surveying a subterranean borehole to determine, for example, the path of the borehole, and more particularly to deployment of primary sensors, such as accelerometers, whose performance in borehole surveying is enhanced by supplemental information from a secondary sensor, such as a magnetometer.

BACKGROUND OF THE INVENTION

The use of accelerometers in prior art subterranean surveying techniques for determining the direction of the earth's gravitation field at a particular point is well known. The use of magnetometers or gyroscopes in combination with one or more accelerometers to determine direction is also known. Deployments of such sensor sets are well known to determine borehole characteristics such as inclination, azimuth, positions in space, tool face rotation, magnetic tool face, and magnetic azimuth (i.e., an azimuth value determined from magnetic field measurements). While magnetometers and gyroscopes may provide valuable information to the surveyor, their use in borehole surveying, and in particular measurement while drilling (MWD) applications, tends to be limited by various factors. For example, magnetic interference, such as from magnetic steel or ferric minerals in formations or ore bodies, tends to cause a deflection in the azimuth values obtained from a magnetometer. Motors and stabilizers used in directional drilling applications are typically permanently magnetized during magnetic particle inspection processes, and thus magnetometer readings obtained in proximity to the bottom hole assembly are often unreliable. Gyroscopes are sensitive to high temperature and vibration and thus tend to be difficult to utilize in MWD applications. Gyroscopes also require a relatively long time interval (as compared to accelerometers and magnetometers) to obtain accurate readings. Furthermore, at low angles of inclination (i.e., near vertical), gyroscopes do not provide accurate azimuth values.

U.S. Pat. No. 6,480,119 to McElhinney, hereafter referred to as the '119 patent, discloses "Gravity Azimuth," a technique for deriving azimuth by comparing measurements from accelerometer sets deployed along, for example, a drill string. The term "gravity azimuth" as used herein refers to the conventional techniques disclosed and claimed in the '119 patent. Using gravity as a primary reference, the '119 patent discloses a method for determining the change in azimuth between accelerometer sets disposed along a drill string, for example. The method assumes a known displacement between the accelerometer sets and makes use of the inherent bending of the bottom hole assembly (BHA) between the accelerometers sets in order to measure the relative change in azimuth.

Moreover, as also disclosed in the '119 patent, derivation of the azimuth conventionally requires a tie-in reference azimuth at the start of a survey section. Using a reference azimuth at the start of a survey results in subsequent surveys having to be referenced to each other in order to determine the well path all the way back to the starting tie-in reference. One conventional way to achieve such "chain referencing" is to survey at depth intervals that match the spacing between two sets of accelerometers. For example, if the spacing between the sets of accelerometers is 30 ft then it is preferable that a well is surveyed at 30 ft intervals. Optimally, though not necessarily, the position of the upper set will overlie the previous lower set.

Surveying in this way is known to be serviceable, however, potentials for improvements have been identified. First, when relating back to a tie-in reference, the survey interval is dictated by the spacing between the sets of accelerometers, possibly causing more surveys and time to be taken than is necessary to survey the borehole and also possibly causing compounding azimuth errors for survey points further down the chain. Second, surveys cannot be taken independently at any position, because they must be related back to the tie-in reference. It would therefore be highly advantageous to enhance gravity based surveying deployments with additional referencing, so that relation back to a tie-in reference might not always be necessary.

The method described and claimed in the '119 patent does not account for any azimuth misalignment (such as a rotational offset) that may be present between the accelerometer sets. Such misalignment, if not connected or accounted for, may introduce significant error to the determined azimuth values. Thus it would also be advantageous to enhance gravity based surveying deployments with an error correction aspect capable of determining and correcting for any azimuthal misalignment between the accelerometer sets.

The method described and claimed in the '119 patent also does not account for the presence of other subterranean structures, such other boreholes, in a surveyed region. For some applications, such as well avoidance and/or well kill applications, it may be desirable to measure the location of other boreholes in relation to the surveyed borehole. Thus it would also be advantageous to enhance gravity based surveying deployments with a passive ranging aspect capable of determining the location of nearby subterranean structures.

SUMMARY OF THE INVENTION

The present invention addresses one or more of the above-described drawbacks of prior art borehole surveying techniques. Referring briefly to the accompanying figures, aspects of this invention include a method for providing and utilizing reference data supplementing primary azimuth determination data (such as accelerometer data). Such supplemental reference data provides for improved accuracy of, for example, azimuth measurements in borehole surveying. In various exemplary embodiments, a drill string includes upper and lower sensor sets including accelerometers. The lower set is typically, but not necessarily, disposed in the bottom hole assembly (BHA), preferably as close as possible to the drill bit assembly. The supplemental reference data may advantageously be provided by one or more magnetometer or gyroscope sensors (or sensor sets) disposed at substantially the same position as one or both of the upper or lower accelerometer sets. In one exemplary embodiment supplemental magnetic reference data is provided by a set of magnetometers disposed at substantially the same position as the upper accelerometer set. Aspects of this invention also include a method for determining the rotational offset between the upper and lower accelerometer sets. Aspects of this invention further include a method for determining the location and direction of a magnetic subterranean structure. Embodiments of this invention may be deployed, for example, in three-dimensional drilling applications in conjunction with measurement while drilling (MWD) and logging while drilling (LWD) methods, Exemplary embodiments of the present invention advantageously provide several technical advantages. For example, supplemental reference data may be used to reference from the bottom up for retrospective correction of the well path. It will be understood that when the borehole is initially near vertical, determination of azimuth is likely to be error prone. A small change in angle of inclination, e.g., 0.01 degrees, may result in the difference between North and South (i.e., an azimuth change of 180 degrees). Thus supplemental reference data may provide substantial retrospective correction of the well path, especially in near vertical segments. A further technical advantage of the supplemental reference data is that it may be used to check the accuracy of the azimuth data. A still further technical advantage of the supplemental reference data is that it offers an independent, stand alone reference downwards. This independent reference is typically not as prone to cumulative errors as the prior art method described in the '119 patent. Further, the upper sensor package becomes a reference point (in embodiments in which the upper sensor set includes reference sensors, e.g., magnetometers). The survey station interval is thus no longer tied to the distance between sensor packages, and may now be any distance. Such flexibility in survey station interval may allow surveying to be more time- and cost-effective, and may further reduce the risk of hole stability problems.

Exemplary embodiments of this invention may further advantageously provide for determination of the rotational offset of the upper and lower accelerometer sets, thereby reducing error in azimuth determination. Exemplary embodiments of this invention may also advantageously provide for improved well avoidance and/or location by improving the accuracy of the determination of the location and direction of magnetic subterranean structures, in particular adjacent boreholes. These and other advantages of this invention will become evident in light of the following discussion of various embodiments thereof.

In one aspect the present invention includes a method for determining the location of a target subterranean structure from within an adjacent borehole. The method includes (a) providing a downhole tool including first and second gravity measurement devices disposed at corresponding first and second positions in the borehole, at least one of the first and second positions selected to be within sensory range of magnetic flux from the subterranean structure. The first and second gravity measurement devices are constrained from rotating with respect to one another about a substantially cylindrical borehole axis. The tool further includes a magnetic field measurement device disposed at one of the first and second positions and within sensory range of magnetic flux from the subterranean structure. The method further includes (b) using the first and second gravity measurement devices to measure corresponding first and second gravity vector sets, and (c) processing the first and second gravity vector sets to determine a local borehole azimuth. The method still further includes (d) measuring a total local magnetic field using the magnetic field measurement device, (e) processing the total local magnetic field, the local azimuth and a reference magnetic field to determine a portion of the total magnetic field attributable to the target subterranean structure. The method yet further includes (f) re-positioning the tool at new locus for first and second positions in the borehole so that the magnetic field measurement device remains within sensory range of the magnetic flux from the subterranean structure, (g) repeating (b), (c), (d), (e), and (f) for a predetermined number of cycles, (h) generating an interference magnetic field vector for each locus for first and second positions, each of the interference magnetic field vectors corresponding to the portion of the total magnetic field determined in (e) at the corresponding locus; and (i) extending the interference magnetic field vectors to determine a location of the target subterranean structure. In another aspect, this invention includes a system for determining the location of a target subterranean structure from within an adjacent borehole. In yet another aspect, this invention includes a computer system including computer-readable logic configured to instruct a processor to execute a method for determining the location of a target subterranean structure from within an adjacent borehole.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should be also be realize by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a schematic representation of an exemplary embodiment of a MWD tool according to the present invention including both upper and lower gravity sensor sets.

FIG. 4 is a schematic representation of an exemplary application of the exemplary MWD tool of FIG. 1.

FIG. 5 is a schematic representation of another exemplary application of the exemplary MWD tool of FIG. 1.

FIG. 6 is a schematic representation of yet another exemplary application of the exemplary MWD tool of FIG. 1.

FIG. 7 is a graphical representation of azimuth versus measured depth for a portion of an exemplary borehole survey.

FIG. 8 is a graphical representation of azimuth versus measured depth for another portion of the survey of FIG. 7.

DETAILED DESCRIPTION

Figure 2:
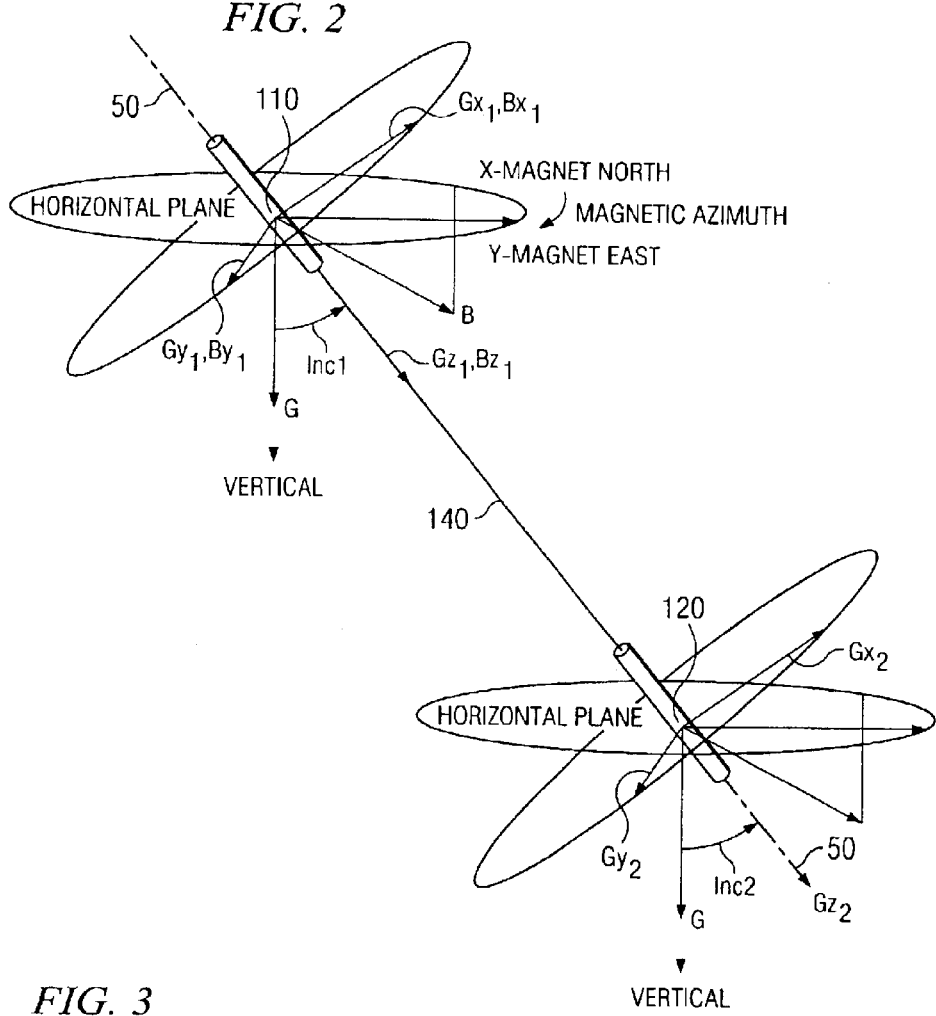
FIG. 2 is a diagrammatic representation of a portion of the MWD tool of FIG. 1 showing the inclination of the upper and lower sensor sets.

Referring now to FIG. 1, one exemplary embodiment of a downhole tool 100 according to the present invention is illustrated. In FIG. 1, downhole tool 100 is illustrated as a measurement while drilling (MWD) tool including upper 110 and lower 120 sensor sets coupled to a bottom hole assembly (BHA) 150 including, for example, a steering tool 154 and a drill bit assembly 158. The upper 110 and lower 120 sensor sets are disposed at a known spacing, typically on the order of about 10 to 20 meters (i.e., about 30 to 60 feet). Each sensor set (110 and 120) includes at least two mutually perpendicular gravity sensors, with at least one gravity sensor in each set having a known orientation with respect to the borehole.

Referring now to FIG. 2, a diagrammatic representation of a portion of the MWD tool of FIG. 1 is illustrated. In the embodiment shown on FIGS. 1 and 2, each sensor set includes three mutually perpendicular gravity sensors, one of which is oriented substantially parallel with the borehole and measures gravity vectors denoted as Gz1 and Gz2 for the upper and lower sensor sets, respectively. The upper 110 and lower 120 sensor sets are linked by a structure 140 (e.g., a semi-rigid tube such as a portion of a drill string) that permits bending along its longitudinal axis 50, but substantially resists rotation between the upper 110 and lower 120 sensor sets along the longitudinal axis 50. Each set of gravity sensors thus may be considered as determining a plane (Gx and Gy) and pole (Gz) as shown. The structure 140 between the upper 110 and lower 120 sensor sets may advantageously be part of, for example, a MWD tool as shown above in FIG. 1. Alternatively, structure 140 may be a part of substantially any other logging and/or surveying apparatuses, such as a wireline surveying tool.

Figure 3:
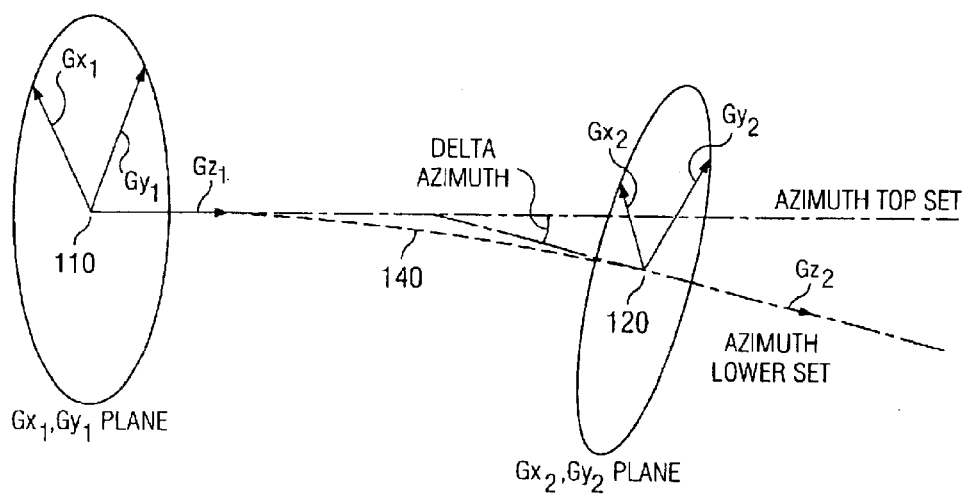
FIG. 3 is another diagrammatic representation of a portion of the MWD tool of FIG. 1 showing the change in azimuth between the upper and lower sensor sets.

Referring now to FIG. 3, the lower sensor set 120 has been moved with respect to upper sensor set 110 (by bending structure 140) resulting in a change in azimuth denoted 'delta-azimuth' in the figure. The following equations show how the foregoing methodology may be achieved. Note that this analysis assumes that the upper 110 and lower 120 sensor sets are rotationally fixed relative to one another.

The borehole inclination (Inc1 and Inc2) may be described at the upper 110 and lower 120 sensor sets, respectively, as follows:

$$Inc1 = \arctan\left(\frac{\sqrt{Gx1^2 + Gy1^2}}{Gz1}\right) \quad \text{Equation 1}$$

$$Inc2 = \arctan\left(\frac{\sqrt{Gx2^2 + Gy2^2}}{Gz2}\right) \quad \text{Equation 2}$$

where G represents a gravity sensor measurement (such as, for example, a gravity vector measurement), x, y, and z refer to alignment along the x, y, and z axes, respectively, and 1 and 2 refer to the upper 110 and lower 120 sensor sets, respectively. Thus, for example, Gx1 is a gravity sensor measurement aligned along the x-axis taken with the upper sensor set 110. The artisan of ordinary skill will readily recognize that the gravity measurements may be represented in unit vector form, and hence, Gx1, Gy1, etc., represent directional components thereof.

The borehole azimuth at the lower sensor set 120 may be described as follows:

$$\text{BoreholeAzimuth} = \text{ReferenceAzimuth} + \text{DeltaAzimuth} \quad \text{Equation 3}$$

where the reference azimuth is the azimuth value at the upper sensor set 110 and where:

$$DeltaAzimuth = \frac{Beta}{1 - \sin((Inc1 + Inc2)/2)} \quad \text{and;} \quad \text{Equation 4}$$

$$Beta = \arctan\left(\frac{(Gx2 * Gy1 - Gy2 * Gx1) * \sqrt{Gx1^2 + Gy1^2 + Gz1^2}}{Gz2 * (Gx1^2 + Gy1^2) + Gz1 * (Gx2 * Gx1 + Gy2 * Gy1)}\right) \quad \text{Equation 5}$$

Using the above relationships, a surveying methodology may be established, in which first and second gravity sensor sets (e.g., accelerometer sets) are disposed, for example. in a drill string. As noted above, surveying in this way is known to be serviceable and has been disclosed in the '119 patent. In order to utilize this methodology, however, a directional tie-in, i.e., an azimuthal reference, is required at the start of a survey. The subsequent surveys are then chain referenced to the tie-in reference. For example, if a new survey point (also referred to herein as a survey station) has a delta azimuth of 2.51 degrees, it is conventionally added to the previous survey point (e.g., 183.40 degrees) to give a new azimuth (i.e., borehole azimuth) of 185.91 degrees. A subsequent survey point having a delta azimuth of 1.17 degrees is again added to the previous survey point giving a new azimuth of 187.08 degrees.

If a new survey point is not exactly the separation distance between the two sensor packages plus the depth of the previous survey point, the prior art recognizes that extrapolation or interpolation may be used to determine the reference azimuth. However, extrapolation and interpolation techniques risk the introduction of error to the surveying results. These errors may become significant when long reference chains are required. Thus it is generally preferred to survey at intervals equal to the separation distance between the sensor sets, which tends to increase the time and expense required to perform a reliable survey, especially when the separation distance is relatively small (e.g., about 30 feet). It is therefore desirable to enhance the downhole surveying technique described above with supplemental referencing, thereby reducing (potentially eliminating for some applications) the need for tie-in referencing.

Aspects of the present invention provide a method for utilizing supplemental reference data in borehole surveying applications. The supplemental reference data may be in substantially any suitable form, e.g., as provided by one or more magnetometers and/or gyroscopes. With continued reference to FIGS. 2 and 3, in one embodiment, the supplemental reference data are in the form of supplemental magnetometer measurements obtained at the upper sensor set 110. The reference azimuth value at the upper sensor set 110, may be represented mathematically, utilizing the supplemental magnetometer data, as follows:

$$ReferenceAzimuth = $$

$$\arctan\left(\frac{(Gx1*By1 - Gy1*Bx1)*\sqrt{Gx1^2+Gy1^2+Gz1^2}}{Bz1*(Gx1^2+Gy1^2) - Gz1*(Gx1*Bx1 - Gy1*By1)}\right)$$

Equation 6 where Bx1, By1, and Bz1 represent the measured magnetic field readings in the x, y, and z directions, respectively, at the upper sensor set 110 (e.g., via magnetometer readings). The borehole azimuth at the lower sensor set 120 may thus be represented as follows:

$$BoreholeAzimuth = $$

$$\arctan\left(\frac{(Gx1*By1 - Gy1*Bx1)*\sqrt{Gx1^2+Gy1^2+Gz1^2}}{Bz1*(Gx1^2+Gy1^2) - Gz1*(Gx1*Bx1 - Gy1*By1)}\right) + \cdots \frac{Beta}{1 - \operatorname{Sin}((Inc1 + Inc2)/2)}$$

Equation 7 where Beta is given by Equation 5 and Inc1 and Inc2 are given by Equations 1 and 2, respectively, as described previously.

It will be appreciated that the above arrangement in which the upper sensor set 110 (FIGS. 1 through 3) includes a set of magnetometers is merely exemplary. Magnetometer sets may likewise be disposed at the lower sensor set 120. For some applications, as described in more detail below, it may be advantageous to utilize magnetometer measurements at both the upper 110 and lower 120 sensor sets. Gyroscopes, or other direction sensing devices, may also be utilized to obtain supplemental reference data at either the upper 110 or lower 120 sensor sets.

It will also be appreciated that the above discussion relates to the generalized case in which each sensor set provides three gravity vector measurements, i.e., in the x, y, and z directions. However, it will also be appreciated that it is possible to take only two gravity vector measurements, such as, for example, in the x and y directions only, and to solve for the third vector using existing knowledge of the total gravitational field in the area. The unknown third gravity vector may be expressed as follows:

$$G_3 = \sqrt{G^2 - G_1^2 - G_2^2}$$

Equation 8 where G3 is the unknown third gravity vector, G is the known local total gravitational vector, and G1 and G2 are the gravity vectors measured by the two gravity sensors in each sensor set (e.g., oriented in the x and y directions). The third gravity vector, G3, may then be used, along with the first two gravity vectors, G1 and G2, in equations 1 through 7 to solve for the borehole azimuth and inclination as described previously.

Likewise, in the absence of magnetic interference, it is possible to take only two magnetic field measurements and to solve for the third using existing knowledge of the total magnetic field in the area. The unknown third magnetic field vector may be expressed as follows:

$$B_3 = \sqrt{B^2 - B_1^2 - B_2^2}$$

Equation 9 where B3 is the unknown third magnetic field vector, B is the known local total magnetic field vector, and B1 and B2 are the magnetic field vectors measured by the two magnetic field measurement sensors in each sensor set (e.g., oriented in the x and y directions). The third magnetic field vector, B3, may then be used, along with the first two magnetic field vectors, B1 and B2, in equations 6 and 7 to solve for the borehole azimuth as described previously.

The artisan of ordinary skill will readily recognize that Equations 8 and 9 result in a positive solution for G3 and B3, respectively. Thus, additional information is typically required in order to accurately determine the sign (positive or negative) of the unknown vector. For example, when Gz is the unknown gravity vector, knowledge of the vertical orientation of the tools may be required, e.g., whether a drilling tool is drilling downward (positive z) or upward (negative z). Alternatively, a survey tool may be rotated in the borehole and surveys taken at two or more rotational orientations. For most applications it is preferable to utilize three mutually orthogonal sensors and to measure each of the three gravity and/or magnetic field vectors. Nevertheless, in operation, situations may arise (such as a failed sensor) in which the use of Equations 8 and/or 9 are useful in the solution of an unknown gravity or magnetic field vector.

The following examples are provided to illustrate exemplary advantages of the surveying methodology of the present invention, utilizing supplemental reference data, for example, in the form of supplemental magnetometer measurements.

Referring now to Table 1, a portion of an exemplary survey conducted at a measured depth ranging from about 10,600 to about 11,300 feet is illustrated. In this example, a prior survey, conducted according to the method disclosed in the '119 patent, is further referenced to supplemental reference azimuths derived via magnetic field measurements. Survey points 1 through 9 are conducted according to the method of the '119 patent, and thus the measured azimuth values at a given survey point are referenced back to the azimuth value of the previous survey point (e.g., the reference azimuth for the second survey point is the azimuth for the first survey point, 189.45 degrees). Survey points 10 through 16, on the other hand, are conducted according to exemplary embodiments of the present invention and as described above utilized supplemental reference azimuths derived from magnetometer readings.

TABLE 1

| Survey Point | Depth (ft) | Inclination (degrees) | Azimuth (degrees) | Gravity Reference | Magnetic Reference |
|---|---|---|---|---|---|
| 1 | 10599 | 2.75 | 189.45 | 189.80 | |
| 2 | 10632 | 2.80 | 189.38 | 189.45 | |
| 3 | 10665 | 2.87 | 189.98 | 189.38 | |
| 4 | 10698 | 2.90 | 189.71 | 189.98 | |
| 5 | 10731 | 2.95 | 189.88 | 189.71 | |
| 6 | 10764 | 2.80 | 190.64 | 189.88 | |
| 7 | 10797 | 2.80 | 190.36 | 190.64 | |
| 8 | 10828 | 2.89 | 189.73 | 190.36 | |
| 9 | 10863 | 2.87 | 193.37 | 189.73 | |
| 10 | 10902 | 3.00 | 199.94 | | 196.14 |
| 11 | 10929 | 3.26 | 203.79 | | 201.71 |
| 12 | 10962 | 3.56 | 204.56 | | 203.28 |

TABLE 1-continued

| Survey Point | Depth (ft) | Inclination (degrees) | Azimuth (degrees) | Gravity Reference | Magnetic Reference |
|---|---|---|---|---|---|
| 13 | 11009 | 4.62 | 210.10 | | 207.37 |
| 14 | 11104 | 6.23 | 223.30 | | 219.83 |
| 15 | 11199 | 7.74 | 238.05 | | 234.14 |
| 16 | 11294 | 9.33 | 254.65 | | 250.54 |

Survey points 1 through 9 are conducted at depth intervals of approximately 33 feet, which corresponds with the spacing between the first and second sensor sets along the drill string. Note, however, that survey points 13 through 16 are conducted at depth intervals of about 95 feet, thus highlighting one advantage of this invention. Since the reference azimuth is determined directly (see Equation 6) at the surveying tool, a survey may be taken at substantially any location, absent magnetic interference effects in the borehole. Surveying in such a manner advantageously reduces the number of required survey points, which typically results in significant time and cost savings. It should also be noted that embodiments of this invention substantially eliminate azimuth errors associated with chain referencing back to a tie-in reference. Note that the supplemental reference azimuth of survey point 10 is about 2.77 degrees greater than (196.14 minus 193.37) the measured azimuth of survey point 9. The use of the supplemental reference data eliminates this source of error since the magnetically derived reference azimuth is "real time", i.e., independent of historical surveys.

The magnetically derived supplemental reference (i.e., that obtained at survey point 10 in Table 1) may also be applied retrospectively to the earlier survey points to remove the reference error (about 2.7 degrees in the example of Table 1). The results of this retrospective correction are shown in Table 2.

TABLE 2

| Survey Point | Depth (ft) | Inclination (degrees) | Azimuth (degrees) | Gravity Reference | Magnetic Reference |
|---|---|---|---|---|---|
| 1 | 10599 | 2.75 | 192.15 | 192.50 | |
| 2 | 10632 | 2.80 | 192.08 | 192.15 | |
| 3 | 10665 | 2.87 | 192.68 | 192.08 | |
| 4 | 10698 | 2.90 | 192.41 | 192.68 | |
| 5 | 10731 | 2.95 | 192.58 | 192.41 | |
| 6 | 10764 | 2.80 | 193.34 | 192.58 | |
| 7 | 10797 | 2.80 | 193.06 | 193.34 | |
| 8 | 10828 | 2.89 | 192.43 | 193.06 | |
| 9 | 10863 | 2.87 | 196.07 | 192.43 | |
| 10 | 10902 | 3.00 | 199.94 | | 196.14 |
| 11 | 10929 | 3.26 | 203.79 | | 201.71 |
| 12 | 10962 | 3.56 | 204.56 | | 203.28 |
| 13 | 11009 | 4.62 | 210.10 | | 207.37 |
| 14 | 11104 | 6.23 | 223.30 | | 219.83 |
| 15 | 11199 | 7.74 | 238.05 | | 234.14 |
| 16 | 11294 | 9.33 | 254.65 | | 250.54 |

The resultant end of the line borehole position at survey point 16 (Tables 1 and 2) is shown in Table 3. The position is shown in "world" coordinates as determined without supplemental referencing (i.e., using the gravity azimuth technique as described in the '119 patent), with supplemental referencing, and with supplemental referencing and retrospective correction. Note that use of embodiments of the supplemental referencing aspect of this invention results in a significant correction in the final surveyed position of the borehole, with the true position (as determined using supplemental referencing) lying about 11 feet north and 4 feet east of that determined using the conventional gravity surveying methodology described in the '119 patent.

TABLE 3

| | East/ West (ft) | North/ South (ft) | Total Vertical Depth (ft) |
|---|---|---|---|
| Without supplemental referencing | −7.53 | −157.01 | 7495.1 |
| With supplemental referencing | −3.25 | −146.33 | 7495.1 |
| With supplemental referencing and retrospective correction | −3.94 | −146.19 | 7495.1 |

Referring now to FIG. 4, the exemplary embodiment of the present invention shown in FIG. 1 is shown deployed in a system for kicking off out of the casing shoe 177 of a preexisting borehole. "Kicking off" refers to a quick change in the angle of a borehole, and may be associated, for example with drilling a new hole from the bottom or the side of an existing borehole. As shown, the bottom hole assembly 150 has penetrated the casing shoe 177. The upper 110 and lower 120 sensor sets remain in the casing 175 of the existing borehole, and emerge therefrom after further drilling. As described in more detail in the example provided below, in embodiments including magnetic sensors, the surveys in the vicinity of the casing shoe 177 may employ conventional gravity surveying methods, thereby chain referencing the azimuth values of the surveyed points to a tie-in reference point located in the existing borehole. When the magnetic sensors, e.g., at sensor set 110, are substantially free of the magnetic interference from the casing 175 and casing shoe 177, surveys utilizing supplemental referencing may be taken according to the present invention at any position, e.g., at about 30 meter (about 98 feet) intervals, and are independent of surveys taken previously or at any time. As described above, this reduces reliance on "chain" surveys, as well as reducing the number of surveys required, while still maintaining the directional information from positions down to a very low position in the BHA—possibly as low as in the drill bit.

Referring now to FIG. 5, the exemplary embodiment of the present invention shown in FIG. 1 is shown deployed in a system for kicking off out of a casing window 178' of a pre-existing borehole. Drilling out of a casing window 178' is similar to drilling out of a casing shoe 177 (FIG. 4) with respect to the inventive surveying techniques disclosed herein. In both instances there tends to be magnetic interference after the sensor packages move out of the casing 175, 175'. Normally the magnetic interference fades more quickly when drilling out of a casing shoe 177 since the distance to the casing 175, 175' increases more rapidly than during drilling out of a casing window 178'. Advantageous deployments of the present invention in penetrating a casing window are substantially analogous to that of penetrating a casing shoe, e.g., as described above with respect to FIG. 4.

Referring now to FIG. 6, the exemplary embodiment of the present invention shown in FIG. 1 is shown deployed in a relief well drilling and/or a well avoidance application. Adjacent wells (e.g., shown as casing 175" in FIG. 6) are known to generate magnetic interference, which tends to interrupt compass-based azimuth surveys in the borehole being drilled. Surveying according to the present invention may be useful in such applications. Advantageously, alternative systems, such as wire line gyroscopes, may be obviated.

Additionally, during the drilling of relief wells, or in well avoidance, it is generally desirable to know the position of the adjacent well to reduce the risk of collision and/or to place the well into the kill zone (e.g., near a well blow out where formation fluid is escaping to an adjacent well). The magnetic techniques used to sense the adjacent borehole position may generally be subdivided into two main groups—active ranging and passive ranging.

In active ranging, an artificial magnetic field is induced into the local subterranean environment. The properties of this field are assumed to vary in a known manner with distance and direction away from the source and thus may be used to determine the location of nearby magnetic subterranean structures.

In contrast, passive ranging, such as disclosed in U.S. Pat. No. 5,675,488 (hereafter referred to as the '488 patent), and as described in more detail below, uses the natural magnetic field emanating from magnetic components within the adjacent borehole (e.g., the casing). As described below, passive ranging techniques generally make no assumptions about the magnetic field strength or the relative magnetic pole positions within the adjacent borehole.

Both active and passive ranging techniques typically require inclination and/or azimuth data from the borehole being drilled. Thus, as described further hereinbelow, aspects of the present invention may advantageously enhance the performance of both active and passive ranging.

Referring now to FIG. 7, a portion of an exemplary survey conducted at a measured depth ranging from about 2,200 to about 5,000 feet is described. A MWD tool deployment similar to that described above with respect to FIG. 1 was utilized. The upper and lower sensor sets each included three mutually perpendicular magnetometers and three mutually perpendicular accelerometers. However, only the magnetometer data from the upper sensor set was utilized in this example. The lower sensor set was disposed about 54 feet below the upper sensor set. FIG. 7 is a graphical representation 200 of azimuth on the ordinate axis 202 versus well depth on the abscissa axis 204 for a portion of a casing window kick-off operation (see, for example, FIG. 5). The azimuth values of the preexisting well, as determined by a conventional gyroscope survey, are shown at 212. The azimuth values determined from the gravity measurements (using the techniques described above) are shown at 214, while azimuth values determined using the magnetic field measurements are shown at 216. The azimuth values determined from the gravity and magnetic field measurements are also shown in tabular form in Table 4 below.

With continued reference to FIG. 7 and Table 4, the survey of this example was tied-in to the gyroscope survey of the preexisting borehole at 232 (survey point 0 in Table 4). In region 222 (survey points 1 through 5) the upper and lower sensor sets (e.g., sensor sets 110 and 120 in FIG. 1) were disposed in the casing of the preexisting borehole. Hence, owing to the magnetic interference emanating from the casing, the azimuth values determined from the magnetic field measurements were rendered unreliable (as shown in Table 4). The azimuth values were thus chain referenced back to the tie-in reference point 232 using the methodology described above. Region 222 is described in further detail below with respect to FIG. 8 and Tables 5 and 6.

With further reference to FIG. 7 and Table 4, the lower sensor set penetrated the casing of the preexisting borehole at point 234 (survey point 6 in Table 4). The azimuth values determined from the magnetic field measurements remained generally unreliable in region 224 (survey points 6 through 15) as the upper sensor set moved away from the casing of the preexisting borehole, but remained within a magnetic interference region. Thus the azimuth values were chain referenced back to the tie-in reference point 232. As a result, survey points were taken at approximately 54 foot intervals (the vertical spacing between the upper and lower sensor sets). Beginning at a measured depth of approximately 3000 feet, the upper sensor set was sufficiently free from magnetic interference for highly effective use of supplemental referencing of the azimuth values. Thus in region 226 (survey points 16 through 41 in Table 4), the survey points were taken according to the supplemental referencing aspect of the present invention as described above. Note that the survey interval at survey points 20 through 41 was increased from about 54 to about 94 feet, representing a significant savings in time and cost.

TABLE 4

| Survey Point | Depth (ft) | Magnetic Azimuth (degrees) | Depth (ft) | Gravity Azimuth (degrees) | Delta Azimuth (degrees) |
|---|---|---|---|---|---|
| 0 | | | 2262 | 91.90 | |
| 1 | 2262 | 291.55 | 2316 | 91.17 | −0.73 |
| 2 | 2312 | 339.93 | 2366 | 87.71 | −3.76 |
| 3 | 2364 | 292.86 | 2418 | 86.08 | −1.70 |
| 4 | 2417 | 20.08 | 2471 | 88.79 | 2.78 |
| 5 | 2465 | 39.86 | 2519 | 92.37 | 4.04 |
| 6 | 2548 | 59.98 | 2602 | 98.59 | 4.06 |
| 7 | 2605 | 263.43 | 2659 | 99.88 | 1.22 |
| 8 | 2656 | 76.62 | 2710 | 102.87 | 3.18 |
| 9 | 2697 | 95.14 | 2751 | 105.73 | 3.78 |
| 10 | 2743 | 124.42 | 2797 | 109.04 | 3.91 |
| 11 | 2791 | 163.24 | 2845 | 111.57 | 2.85 |
| 12 | 2844 | 107.02 | 2898 | 112.10 | 0.54 |
| 13 | 2885 | 116.53 | 2939 | 111.81 | −0.38 |
| 14 | 2931 | 112.22 | 2985 | 113.27 | 1.72 |
| 15 | 2980 | 114.56 | 3034 | 116.51 | 3.58 |
| 16 | 3027 | 117.99 | 3081 | 120.65 | 2.66 |
| 17 | 3073 | 123.17 | 3127 | 124.33 | 1.16 |
| 18 | 3123 | 123.94 | 3177 | 125.26 | 1.32 |
| 19 | 3167 | 125.79 | 3221 | 126.84 | 1.04 |
| 20 | 3261 | 126.97 | 3315 | 130.33 | 3.36 |
| 21 | 3354 | 132.49 | 3408 | 138.13 | 5.64 |
| 22 | 3446 | 142.92 | 3500 | 148.69 | 5.77 |
| 23 | 3539 | 153.26 | 3593 | 157.65 | 4.39 |
| 24 | 3631 | 163.98 | 3685 | 168.95 | 4.97 |
| 25 | 3725 | 174.33 | 3779 | 179.36 | 5.03 |
| 26 | 3818 | 185.90 | 3872 | 192.31 | 6.41 |
| 27 | 3910 | 197.32 | 3964 | 201.11 | 3.78 |
| 28 | 4004 | 208.29 | 4058 | 208.94 | 0.66 |
| 29 | 4097 | 207.96 | 4151 | 208.55 | 0.60 |
| 30 | 4191 | 208.98 | 4245 | 209.02 | 0.04 |
| 31 | 4284 | 210.55 | 4338 | 210.68 | 0.13 |
| 32 | 4377 | 208.67 | 4431 | 205.98 | −2.69 |
| 33 | 4469 | 205.75 | 4523 | 205.25 | −0.50 |
| 34 | 4469 | 206.55 | 4523 | 205.67 | −0.89 |
| 35 | 4469 | 205.05 | 4523 | 204.36 | −0.68 |
| 36 | 4563 | 203.99 | 4617 | 200.04 | −3.95 |
| 37 | 4657 | 196.09 | 4711 | 195.53 | −0.56 |
| 38 | 4750 | 195.81 | 4804 | 195.72 | −0.09 |
| 39 | 4843 | 196.44 | 4897 | 199.44 | 3.00 |
| 40 | 4937 | 200.50 | 4991 | 203.22 | 2.71 |
| 41 | 5000 | 205.33 | 5054 | 205.94 | 0.61 |

Typically supplemental referencing may be highly efficacious even in the presence of low-level magnetic interference. As described above, and shown in the previous example, at higher levels of magnetic interference the azimuth values determined from the magnetic field measurements are not optimum and may be unreliable (depending upon the magnitude of the magnetic interference). It may thus be advantageous in certain applications to utilize a predetermined magnetic interference threshold to determine when the magnetic field measurements are sufficiently free from magnetic interference for the effective use of supplemental referencing. In such a set-up, supplemental referencing might be utilized at survey points having magnetic interference values less than the threshold, and chain referencing might be utilized at survey points having magnetic interference values greater than the threshold. In such a manner, both supplemental referencing and chain referencing might be utilized in one survey. At the onset of sufficiently high magnetic interference (e.g., above the threshold), the supplemental referencing might be turned off in favor of conventional chain referencing (e.g., back to a survey point having sufficiently low magnetic interference). As drilling progresses and the magnetic interference decreases (e.g., below the threshold) the supplemental referencing may be turned on, thereby eliminating the need for chain referencing in that region of the borehole. Further, the azimuth values determined in the sections of the borehole utilizing chain referencing may optionally be retrospectively corrected (e.g., from below) using the supplemental reference azimuth values.

The artisan of ordinary skill will readily recognize that referencing the azimuth to a sensor set including magnetometers in the absence of magnetic interference is substantially equivalent to referencing to a sensor set including a north seeking or inertial gyroscope. In methods utilizing a gyroscope reference, the gyro is typically capable of determining a reference azimuth, which may be used in a similar manner to that described above by other sensor set(s), possibly containing accelerometers only for the purpose of giving independent azimuths low in the BHA. A circumstance where this may be desirable would be when movement may be affecting gyro surveys, as North seeking generally requires a gyro to be stationary for a few minutes. By deriving another azimuth with the accelerometers, the number of gyro surveys maybe greatly reduced and the gravity results may help determine the quality and accuracy of the gyro surveys.

Referencing to a magnetometer package or gyro within the same system means an increase in accuracy of the combined surveys may be obtained. Enhancing with supplemental reference data per the present invention provides the opportunity for an increase in the overall certainty/accuracy/quality of the combined measurements. The potential increase in measurement precision will be seen to be particularly advantageous in embodiments where gravity systems have double or even triple measurements from the same or different derivations and sensors.

As described above with respect to Equation 3, the borehole azimuth at a given survey point is equal to the sum of a reference azimuth and the change in azimuth between the two gravity sensor sets. The supplemental referencing aspect of this invention, as described above, advantageously enhances the accuracy of the borehole azimuth value by enhancing the accuracy of the reference azimuth. Supplemental referencing, however, is not necessarily advantageous in improving the accuracy of the measured change in azimuth between the sensor sets. Thus it may also be desirable, or even required for some applications, to correct for causes that result in significant errors to the measured change in azimuth. One such potential source of error is rotational offset between the gravity sensor sets (i.e., misalignment between the x and y axes of the sensor sets). If the two sets of gravity sensors are not rotationally aligned, it may be possible to measure the rotational offset between them as an angular displacement, for example, by measuring the orientation of each set as it is lowered into the borehole. It will be appreciated that once identified and measured or calculated, any offset may then be corrected for.

However, in some applications, it may be highly advantageous to be able to do any accounting for rotational offset downhole as well as topside. Thus, according to another aspect of this invention, the rotational offset (also referred to as Rc) may be determined and corrected for if three or more azimuth values from a section of the borehole are previously known, for example, from a previous gyroscope survey. Azimuth values are determined at three or more (preferably five or more) points along the previously surveyed portion of the borehole. The measured azimuth values are then compared with the known azimuth values. The rotational offset is varied until the measured azimuth values substantially match and/or fit the known azimuth values.

Referring now to Tables 5 and 6, an example is provided to illustrate one exemplary approach for determining the rotational offset between the upper and lower gravity sensor sets (e.g., accelerometer sets). The example described below is taken from the same survey as described above with respect to FIG. 7. As described above, a previously drilled borehole was surveyed using a gyroscope. Azimuth values as a function of well depth are shown in Table 5 for a three hundred foot section of the well (approximately region 222 on FIG. 7). At a measured depth of about 2262 feet, the lower accelerometer set was referenced (i.e., tied-in) to the azimuth value (91.90 degrees) from the previous gyroscopic survey taken at that depth. As described above with respect to FIG. 7 and Table 4, the upper sensor set was positioned approximately 54 feet above the lower sensor set. Hence, subsequent gravity surveys were conducted at about 54 foot intervals over approximately a three hundred foot section of the borehole. Azimuth values were then calculated assuming various rotational offset values as shown in Table 5. In order to calculate the azimuth values, the gravity sensor measurements Gx2 and Gy2 were corrected for the rotational offset using well known trigonometric techniques. Exemplary equations used to determine the corrected Gx2 and Gy2 values from the measured Gx2 and Gy2 values are given below as Equations 10 and 11.

$$Gx2corrected = \sin\left(\arctan\left(\frac{Gx2}{Gy2}\right) + Rc\right)\sqrt{Gx2^2 + Gy2^2} \quad \text{Equation 10}$$

$$Gy2corrected = \cos\left(\arctan\left(\frac{Gx2}{Gy2}\right) + Rc\right)\sqrt{Gx2^2 + Gy2^2} \quad \text{Equation 11}$$

where Gx2corrected and Gy2corrected represent the corrected gravity vectors, Gx2 and Gy2 represent the measured gravity vectors, and Rc represents the rotational offset between the upper and lower sensor sets. Gz2 remains unchanged.

Measured and corrected values are shown in Table 6 for a rotational offset of 267.7 degrees. The azimuth values were then calculated using the methodology described above with respect to Equations 3 through 5.

TABLE 5

| Depth (ft) | Gyro Azimuth (degrees) | GMWD Azimuth (degrees) Rc = 266.0 degrees | GMWD Azimuth (degrees) Rc = 267.7 degrees | GMWD Azimuth (degrees) Rc = 269.0 degrees |
|---|---|---|---|---|
| 2262 | 91.9 | 91.90* | 91.90* | 91.90* |
| 2316 | 92.45 | 91.17 | 90.20 | |
| 2362 | 87.4 | | | |
| 2366 | 90.17 | 87.71 | 85.82 | |
| 2418 | 89.80 | 86.08 | 83.23 | |
| 2462 | 88.0 | | | |
| 2471 | 93.83 | 88.79 | 84.93 | |

TABLE 5-continued

| Depth (ft) | Gyro Azimuth (degrees) | GMWD Azimuth (degrees) Rc = 266.0 degrees | GMWD Azimuth (degrees) Rc = 267.7 degrees | GMWD Azimuth (degrees) Rc = 269.0 degrees |
|---|---|---|---|---|
| 2519 | 98.61 | 92.37 | 87.60 | |
| 2563 | 94.8 | | | |

TABLE 6

| Depth (ft) | Gyro Azimuth (degrees) | GMWD Azimuth (degrees) Rc = 267.7 degrees | Gx2, Gy2 Measured | Gx2, Gy2 Corrected Rc = 267.7 |
|---|---|---|---|---|
| 2262 | 91.9 | 91.90 | | |
| 2316 | | 91.17 | −0.170, 0.232 | −0.225, −0.179 |
| 2362 | 87.4 | | | |
| 2366 | | 87.71 | −0.241, 0.175 | −0.165, −0.248 |
| 2418 | | 86.08 | −0.151, −0.269 | 0.274, −0.140 |
| 2462 | 88.0 | | | |
| 2471 | | 88.79 | −0.195, −0.260 | 0.267, −0.185 |
| 2519 | | 92.37 | −0.180, −0.277 | 0.284, −0.168 |
| 2563 | 94.8 | | | |

The azimuth-depth profiles may be matched using substantially any technique including known graphical and numerical methods. For example, with reference to FIG. 8, a graphical representation 300 of azimuth on the ordinate axis 302 versus well depth on the abscissa axis 304 is shown. The previous gyroscopic survey is shown at 310. The azimuth values at rotational offset values of 266.0, 267.7, and 269 degrees, for example, are shown at 312, 314, and 316, respectively. A best fit is indicated at a rotational offset of approximately 267.7 degrees (see also Table 5). As stated above, numerical methods, including, for example, least squares techniques that iterate the rotational offset, may readily be used to determine the best fit between the previously determined azimuth values and those determined in the gravity survey. Alternatively, the rotational offset may be determined using known graphical methods, for example, in a spread sheet software package, and the rotational offset values manually iterated until a graphical "best-fit" is achieved. It will be understood that determination of a suitable fit is not limited to plots of azimuth versus well depth, such as that shown on FIG. 8. Rather, any view of the azimuth values suitable for comparing the previously measured (known) and as measured azimuth values may be utilized. For example, in some applications it may be advantageous to plot the azimuth values on a plan view. Additionally, various data filtering techniques may be utilized to reduce noise in the measured azimuth values, as is often observed in wells having a near vertical inclination. For example, minimum curvature calculations may be utilized in conjunction with a plan view to constrain the azimuth values to a range of values consistent with known achievable borehole profiles.

Optimal precision in determining the rotational offset is typically achieved in borehole sections that are near vertical since the sensitivity of the conventional gravity azimuth techniques (i.e., as disclosed in the '119 patent) is greatest in such near vertical wells (e.g., wells having an inclination of less than about 10 degrees). However, at extremely low inclinations (e.g., less than about 1 degree) azimuth values are well known to be inherently unreliable (since the horizontal component of the borehole is insignificant as compared to the vertical component). Thus for many applications it may be desirable to determine the rotational offset of the accelerometer sets in a well section having an inclination value in the range from about 1 to about 10 degrees.

The approach described above for determining the rotational offset between the upper and lower accelerometer sets also advantageously provides an error reduction scheme that corrects for other systemic errors in addition to the rotational offset. Utilization of the above-described approach advantageously corrects for substantially all azimuthal misalignment errors between the accelerometer sets. One example of such a misalignment includes off-axis positioning of the accelerometers in, for example, a drill string.

As described above, the supplemental referencing aspect of this invention may be effectively practiced utilizing supplemental magnetic field measurements taken, for example, from magnetometers disposed with one or both of the gravity sensor sets. Also, as described above, the supplemental referencing aspect of this invention may be highly effective in determining azimuth values even in the presence of low-level magnetic interference, but tends not to be optimum at higher levels of magnetic interference. Nevertheless, a supplemental referencing set-up utilizing supplemental magnetic field measurements may be particularly advantageous in that it may be used in conjunction with methods disclosed in U.S. Pat. No. 5,675,488, for example, in well avoidance and/or subterranean structure location applications, even when the magnetic interference levels are sufficiently high so as to not be advantageous for azimuth determination. Such passive ranging utilizes the magnetic interference emanating from magnetic subterranean structures to advantageously determine their location, direction, and/or orientation (i.e., inclination and/or azimuth) relative to the surveyed borehole.

In order to determine the magnetic interference vector at any point downhole, the magnetic field of the earth must be subtracted from the measured magnetic field vector. The magnetic field of the earth (including both magnitude and direction components) is typically known, for example, from previous geological survey data. However, for some applications may be advantageous to measure the magnetic field in real time on site at a location substantially free from magnetic interference, e.g., at the surface of the well or in a previously drilled well. Measurement of the magnetic field in real time is generally advantageous in that in that it accounts for time dependent variations in the earth's magnetic field, e.g., as caused by solar winds. However, at certain sites, such on an offshore drilling rig, measurement of the earth's magnetic field in real time may not be possible. In such instances, it may be preferable to utilize previous geological survey data in combination with suitable interpolation and/or mathematical modeling (i.e., computer modeling) routines. It is also necessary to know the orientation of the magnetometer sensors in the borehole being drilled, which may be determined, for example, by the surveying techniques described above.

The earth's magnetic field at the tool may be expressed as follows:

$$M_{EX} = H_E(\cos D \sin Az \cos R + \cos D \cos Az \cos Inc \sin R - \sin D \sin Inc \sin R)$$

$$M_{EY} = H_E(\cos D \cos Az \cos Inc \cos R + \sin D \sin Inc \cos R - \cos D \sin Az \sin R)$$

$$M_{EZ} = H_E(\sin D \cos Inc - \cos D \cos Az \sin Inc) \quad \text{Equation 12}$$

where Mex, Mey, and Mez represent the x, y, and z components, respectively, of the earth's magnetic field as measured at the down hole tool, where the z component is aligned with the borehole axis, He is known (or measured as described above) and represents the magnitude of the earth's magnetic field, and D, which is also known (or measured), represents the local magnetic dip. Inc, Az, and R, represent the Inclination, Azimuth and Rotation (also known as the gravity tool face), respectively, of the tool and tare typically determined from gravity, magnetic, and/or gyroscope sensor measurements as described above. The magnetic interference vectors may then be represented as follows:

$$M_{IX}=B_X-M_{EX}$$

$$M_{IY}=B_Y-M_{EY}$$

$$M_{IZ}=B_Z-M_{EZ}$$
Equation 13 where Mix, Miy, and Miz represent the x, y, and z components, respectively, of the magnetic interference vector and Bx, By, and Bz, as described above, represent the measured magnetic field vectors in the x, y, and z directions, respectively.

The artisan of ordinary skill will readily recognize that in determining the magnetic interference vectors it may also be necessary to subtract other magnetic field components, such as drill string and/or motor interference from the borehole being drilled, from the measured magnetic field vectors.

It should be noted that the magnetic interference may emanate from substantially any point or points on a target well. It may also have substantially any field strength and be oriented at substantially any angle to the target well. It is the particular shape of the field, rather than its strength, that enables the source to be located using the method of this invention, which assumes, as described in more detail below, that a target well behaves substantially equivalently to one or more cylindrical magnets. Thus it is assumed herein that the shape of the magnetic flux lines is consistent with having emanated from a cylindrical magnet.

The magnetic interference from the metal objects in an adjacent well is typically caused by the tubular elements therein, e.g., the casing, drill string, collars, and the like. The magnetic interference surrounding these elements is determined by the magnetism (both induced and permanent) in the metal. The shape of the interference pattern is particularly influenced by the homogeneity of the magnetism and the shape of the metal element. Typically, the magnetism is substantially homogeneous and the shape rotationally symmetrical and tubular. Objects in a borehole, such as pipe sections and the like, are often threadably coupled to form a substantially continuous cylinder. Thus, the origin of any magnetic interference from a borehole may generally be considered to originate in cylinders in the target well, the magnetic field emanating from such cylinders in a manner typically displayed by cylindrical magnets. The field strength decreases with distance from the borehole. The magnetic interference may be measured as a vector whose orientation depends on the location of the measurement point within the magnetic field.

Figure 9:
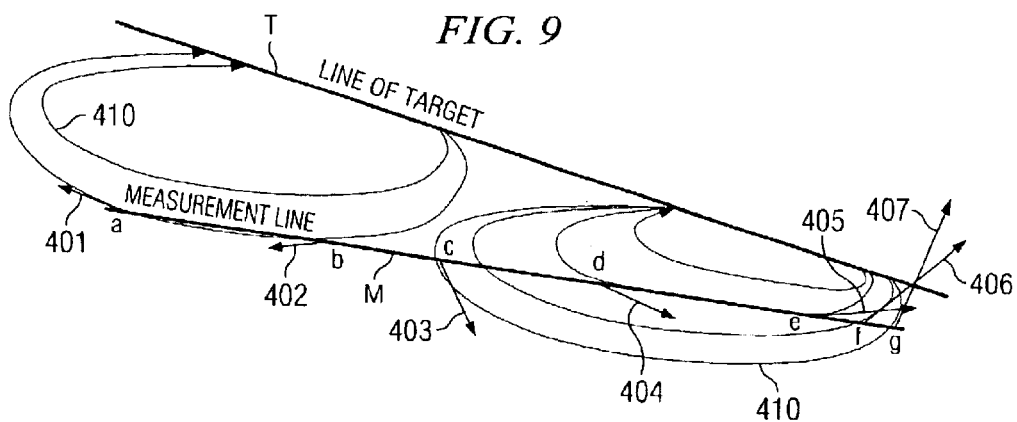
FIG. 9 is a schematic representation illustrating the relationship between the path of a borehole from which measurements are taken, the path of an adjacent borehole, magnetic field lines from the adjacent borehole, and measured magnetic interference vectors.

Referring now to FIG. 9, the relationship between the path M of the borehole being drilled (also referred to as the measurement line), the line of an adjacent target well T (also referred to as the target line or as an adjacent well or borehole), and the calculated interference vectors 401 through 407 measured at various points a through g along the path M are shown. Magnetic field lines 410 owing to the "cylindrical magnets" in the target well are also shown. As shown the measured interference vectors 401 through 407 are tangential to the field lines 410 at points a through g, respectively. It should be noted that it is not necessary to know the magnitude of the vectors. Thus, in this technique, each vector may be extended to a substantially infinite line in three-dimensional space.

Figure 10:
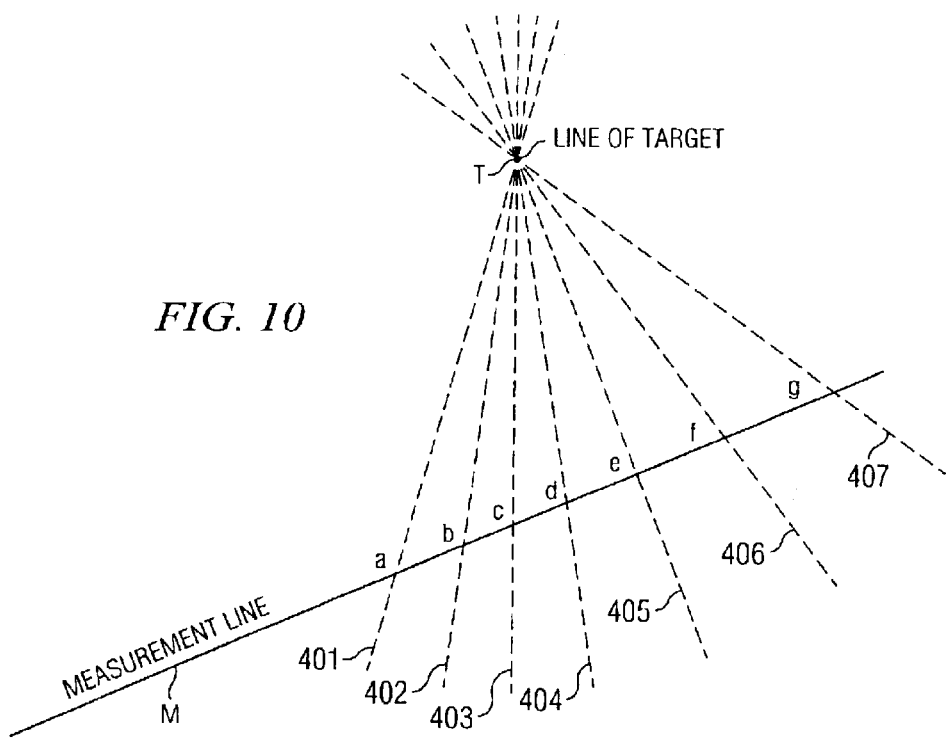
FIG. 10 is a schematic representation similar to that of FIG. 9, excluding the magnetic field lines and viewed along the line of the adjacent borehole.

Referring now to FIG. 10, the path M of the borehole being drilled, the target borehole T, and the interference vectors 401 through 407 are shown projected on a plane substantially perpendicular to the target borehole T (i.e., the pole of the plane is along the target borehole T). The interference vectors 401 through 407 are shown extended as dotted lines. The interference vectors 401 through 407 each substantially intersect the target borehole T, and thus appear to intersect at a point T in FIG. 10. The direction and location of the target borehole T may therefore be determined, as described further below, by determining the plane perpendicular to the target well.

Figure 11:
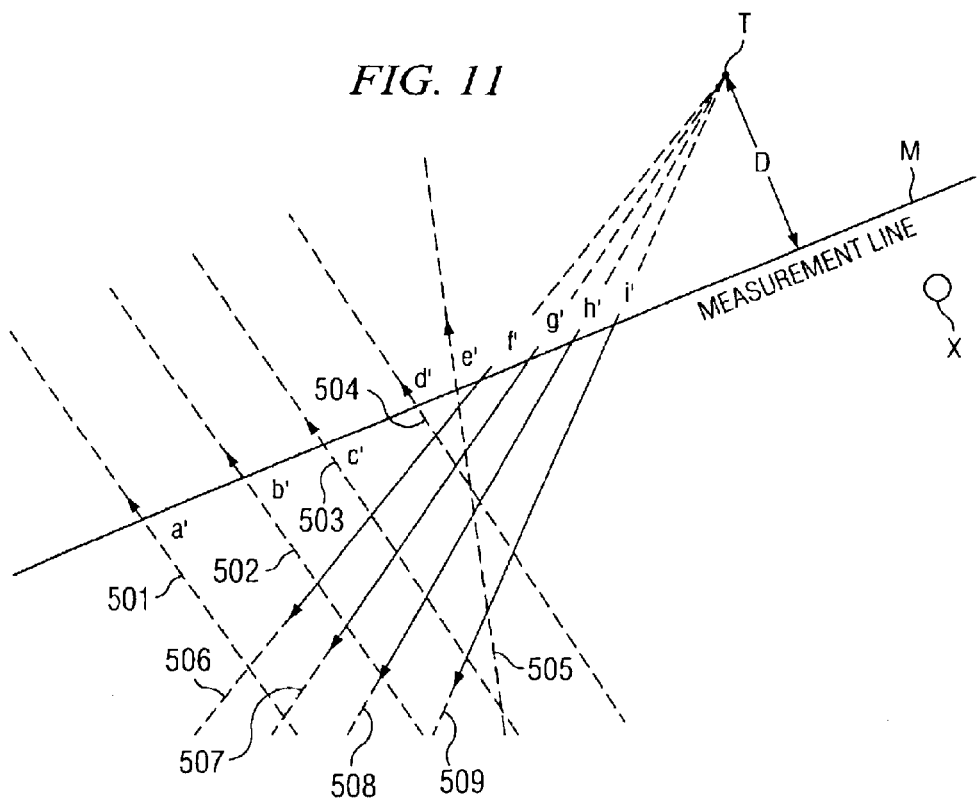
FIG. 11 is a schematic representation of a hypothetical example of typical magnetic interference vectors that would be measured at various locations along a borehole as an adjacent borehole is approached.

Referring now to FIG. 11, a hypothetical exemplary drilling operation is shown, with the interference vectors typically measured at various points a' through i' along the measurement line M (i.e., the borehole being drilled). Lines 501 through 509 are the extended lines, which include the linear interference vectors. Lines 501 through 504 are extended from interference vectors measured at points a' through d', respectively, along the measurement line M. At these points there is no appreciable magnetic interference from the target well T. The interference vectors 501 through 504 have been corrected for the effects of the earth's magnetic field (as described above with respect to Equations 12 and 13) and are owing to, for example, interference from the drill string in the borehole being drilled. At point e' on the measurement line M, interference from the target well T is detected and the vector extended to line 505 is the result of a combination of drill string interference and interference from the adjacent well. As the borehole being drilled approaches the target well T the magnetic interference therefrom tends to increase as compared to the drill string interference. Lines 506 through 509 are extended from vectors that have been corrected for drill string interference and thus essentially due only to interference from the target well. As shown, each of lines 506 through 509 cross the axis of the target well T, which is substantially perpendicular to the plane of FIG. 11. FIG. 11 also shows the position X at which the target well T was thought to be using a gyro technique.

In a typical drilling operation, in which avoidance of a nearby structure, for example, is highly desirable or even required, the surveying techniques of this invention may be utilized to determine the inclination and azimuth of the measured well during drilling. At the indication of an outside source of magnetic interference, e.g., two or more survey points having a magnetic interference vector with a magnitude greater than some predetermined threshold, it may be appropriate to reverse the tool and take additional magnetometer readings. Such a procedure may enable analysis of the position of the source of interference to be determined so that corrective action (e.g., well avoidance procedures), if necessary, may be taken. At each survey point the azimuth and inclination of the borehole being drilled are typically determined, for example, using the surveying techniques described above. If the magnitude of magnetic interference from the adjacent borehole is sufficiently large, the azimuth values may need to be chain referenced back to a prior survey point at which substantially no magnetic interference was present in order to assure integrity of supplemental reference data provided by magnetometers. The component of the total magnetic field attributable to the outside interference is then determined at each survey point, as described above with respect to Equations 12 and 13. The position of the interference vectors along the borehole for each survey point may be determined using the azimuth and inclination values taken from the survey in conjunction with any suitable method known to those skilled in the art, such as minimum curvature, radius of curvature, average angle techniques, and the like.

In many applications, it is desirable to determine the inclination and azimuth of the target well T as well as the displacement D (the nearest distance) between the measured borehole and the target line T. If no information is available on the spatial location of the target well T, at least four vectors are generally required to determine the above factors. If one parameter of the target well T is known, e.g., azimuth, generally only three vectors are required. If the azimuth and inclination are already known, a solution of the displacement D may be found with only two vectors. In other applications, the azimuth and inclination may be known within a range, for example, it may be known that the azimuth is in the range from about 200 to 240 degrees and the inclination is in the range from about 5 to 15 degrees. Such information does not typically reduce the number of vectors required but may significantly reduce the time required for a calculation of a solution for azimuth, inclination and displacement of the target well by constraining the solution thereof.

Having determined the interference vectors and generated a set of extended lines therefrom, it is necessary to find the viewing plane at which the intersection points of the vectors (extended lines) substantially cross the target well T, as shown in FIG. 10. As described below with respect to FIG. 13, such a viewing plane is typically selected to be one in which the distance between the intersection points and the target well is at a minimum. Such a viewing plane as describe above is substantially orthogonal to the target well (i.e., having a pole along the target well). Determination of the viewing plane may be accomplished by utilizing a three dimensional CAD package and changing the viewing angle or viewing plane interactively to find the plane at which the vectors (or extended lines) appear to substantially cross. However, it is typically desirable to determine the plane mathematically, for example, by converting the vectors into linear equations and using conventional techniques such as a least squares technique (or other technique such as spline fitting and the like).

In one approach, the magnetic interference vectors given in Equation 13 are transformed into azimuth, magnetic dip, and magnitude coordinates as given below:

$$Azi_I = \arctan\left(\frac{G(M_{IX}Gy - M_{IY}Gx)}{M_{IX}GxGz + M_{IY}GyGz + M_{IZ}(Gx^2 + Gy^2)}\right) \quad \text{Equation 14}$$

$$Dip_I = \arctan\left(\frac{M_{IY}}{\sqrt{M_{IY}^2 + M_{IY}^2 + M_{IZ}^2 + (M_{IX}Gx + M_{IY}Gy - M_{IZ}Gz)/G}}\right)$$

$$M_I = \sqrt{M_{IX}^2 + M_{IY}^2 + M_{IZ}^2}$$

where $Azi_I$, $Dip_I$, and $M_I$ are the azimuth, dip and magnitude, respectively, of the interference vectors.

The vectors are then rotated in an iterative fashion in both a horizontal plane (e.g., about the z-axis in "world" coordinates) and a vertical plane (e.g., about either the x- or y-axes in "world" coordinates) by adding angle increments to the azimuth and dip values, respectively, given in Equation 14. At each rotational increment, the interference vectors are projected onto a two-dimensional view and the distances between the intersection points of the various extended interference vectors are calculated. Such a rotational iteration is continued until a two-dimensional view is found in which the distances between the intersection points are substantially at a minimum (e.g., the view on FIG. 10). As described above, the two-dimension view (i.e., the plane) at which such a minimum is found is taken to be substantially orthogonal to the target well. The location of the target well in such a two-dimensional view may be found, for example, by taking a mathematical average (or a weighted mathematical average) of the locations of the various intersection points. It will be understood that mathematical techniques other than averaging may be utilized to determine the location of the target well. As described above, the number of vectors utilized, and therefore the number of intersection points, depends on the analysis required. Typically three to five (or more) interference vectors are utilized resulting in three to ten (or more) intersection points between the various interference vectors.

Figure 13:
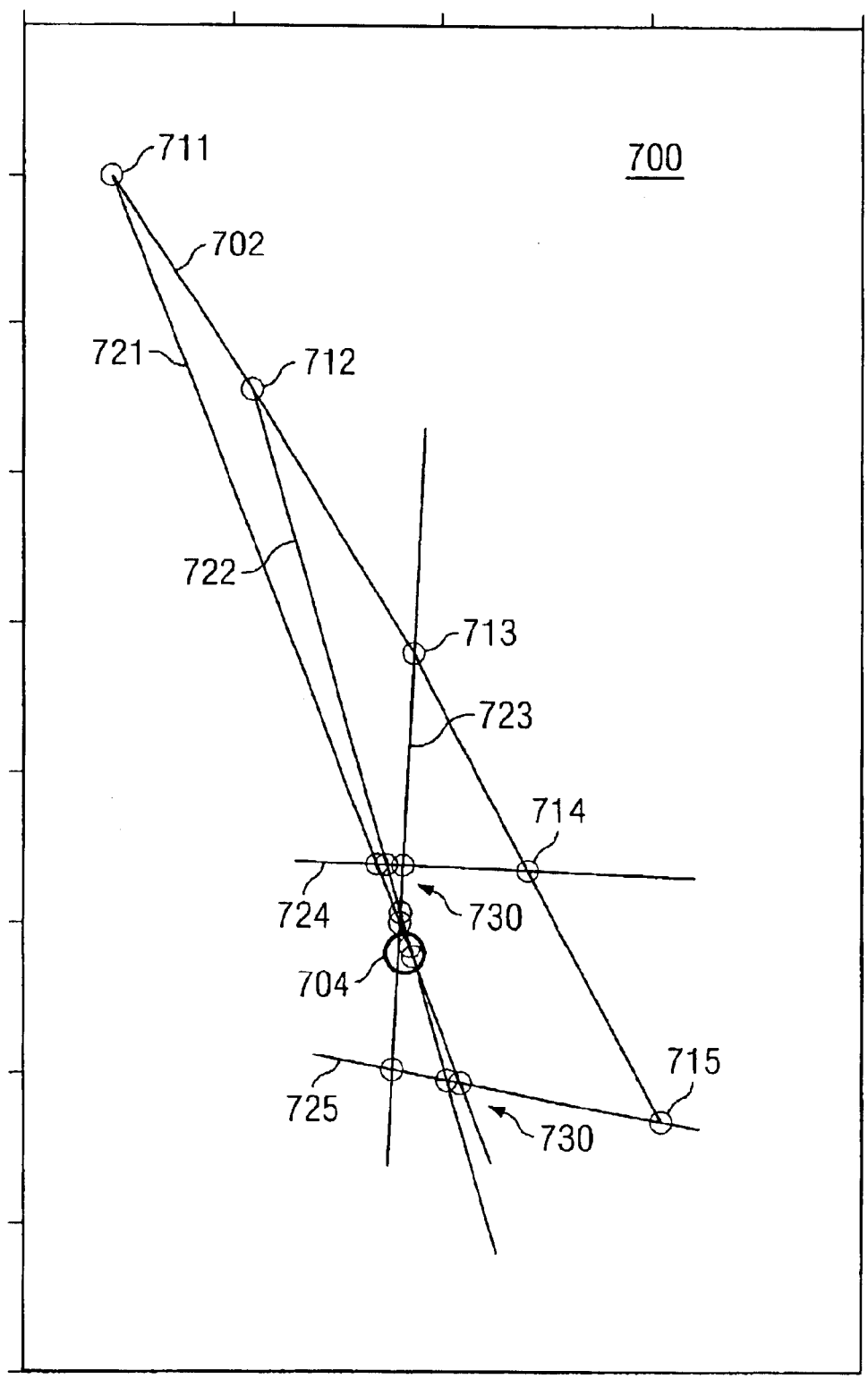
FIG. 13 is a graphical representation similar to that of FIG. 10 for a portion of the example of FIG. 12.

Upon determining x and y coordinates of the target well (in the coordinate system of the two-dimensional view), the location and orientation (i.e., inclination and azimuth) of the target well (e.g., target well T in FIGS. 9 through 11) may be determined in either "world" coordinates or the coordinate system of the measured borehole using conventional mathematical techniques. The distance and the direction (referred to commonly as rotation or tool face) to the target well at each surveyed point in the measured well may be given, respectively, as:

$$Dn = \sqrt{(x_{T-xn})^2 + (y_{T-yn})^2} \quad \text{Equation 15}$$

$$Rn = \arctan\left(\frac{(x_T - xn)}{(y_T - yn)}\right) \quad \text{Equation 16}$$

where n represents the individual survey points, e.g., 1, 2, 3, etc., xn and yn are the x and y coordinates, respectively, of survey point n in the two-dimensional view, and $X_T$ and $Y_T$ are the x and y coordinates of the target well in the two-dimensional view. It will be understood that xn, yn, $x_T$, and $y_T$ are given in the coordinates system of the two-dimensional view described above (e.g., as shown in FIGS. 10 and 13). A comparison of the distance to the adjacent well from one survey point to the next provides valuable information, for example, regarding whether the survey tool (e.g., in a drilling operation) in the measured well is moving towards or away from the target well. The rotation (tool face) is also advantageous to know in that it indicates the direction that drilling must commence in order to move towards (e.g., in a well kill operation) or away from (e.g., in a well avoidance application) the target well.

The inclination and azimuth of the target well may be determined from the angular orientation of the plane orthogonal to the target well. The orientation of the plane is known from the rotational iteration of the interference vectors about a horizontal and vertical plane, as described above. The angle to the horizontal plane represents the azimuth of the target well while the inclination of the target well may be derived from the angle to the vertical plane. Determining the inclination and azimuth of the target well may be useful in certain applications, in particular in a multi-well environment in which knowledge of the inclination and azimuth values may enable the target well to be identified based upon previous survey data.

In determining the location of the target well, it may be advantageous in certain applications to employ one or more techniques to minimize or eliminate the effect of erroneous data. For example, one suitable technique that may be optionally utilized is a "maximum distance limit" that eliminates outlying intersections points that are greater than some predetermined distance threshold (e.g., 500 feet) from the survey point. Such intersection points typically, although not necessarily, exceed the normal range of passive ranging, and thus may optionally be considered as erroneous. In some applications, e.g., a well kill operation, in which the target well is known to be relatively close to the measured well, it may be reasonable to significantly reduce the "maximum distance limit" threshold, for example, to 100 feet or less. Alternatively and/or additionally, it may be advantageous to apply statistical methods to eliminate outlying intersection points, for example, removing intersection points that are greater than two standard deviations away from the above described mathematical average. In certain instances it may also be desirable to remove individual interference vectors from the above analysis. For example, an interference vector may be removed if the "maximum distance limit" and/or the statistical methods described above eliminate two or more intersection points from that interference vector. Alternatively and/or additionally, an interference vector may be removed when the magnitude of the interference magnetic field vector is less than some minimum threshold (e.g., 0.001 Gauss).

Figure 14:
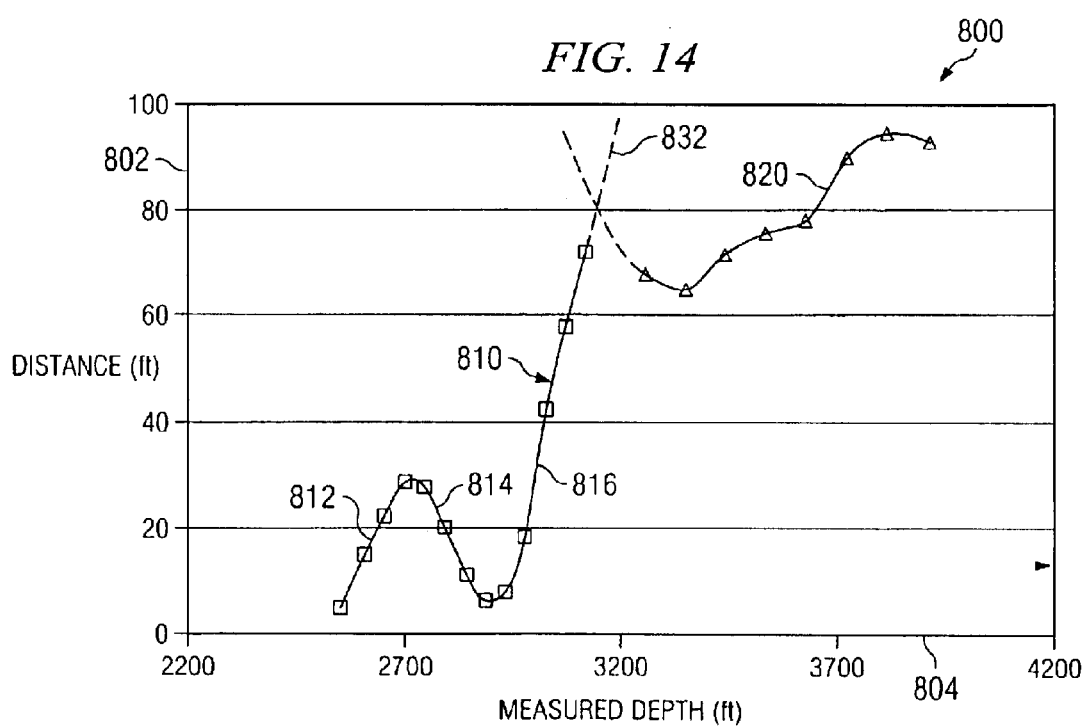
FIG. 14 is a graphical representation of distance to the target well versus measured depth.
Figure 12:
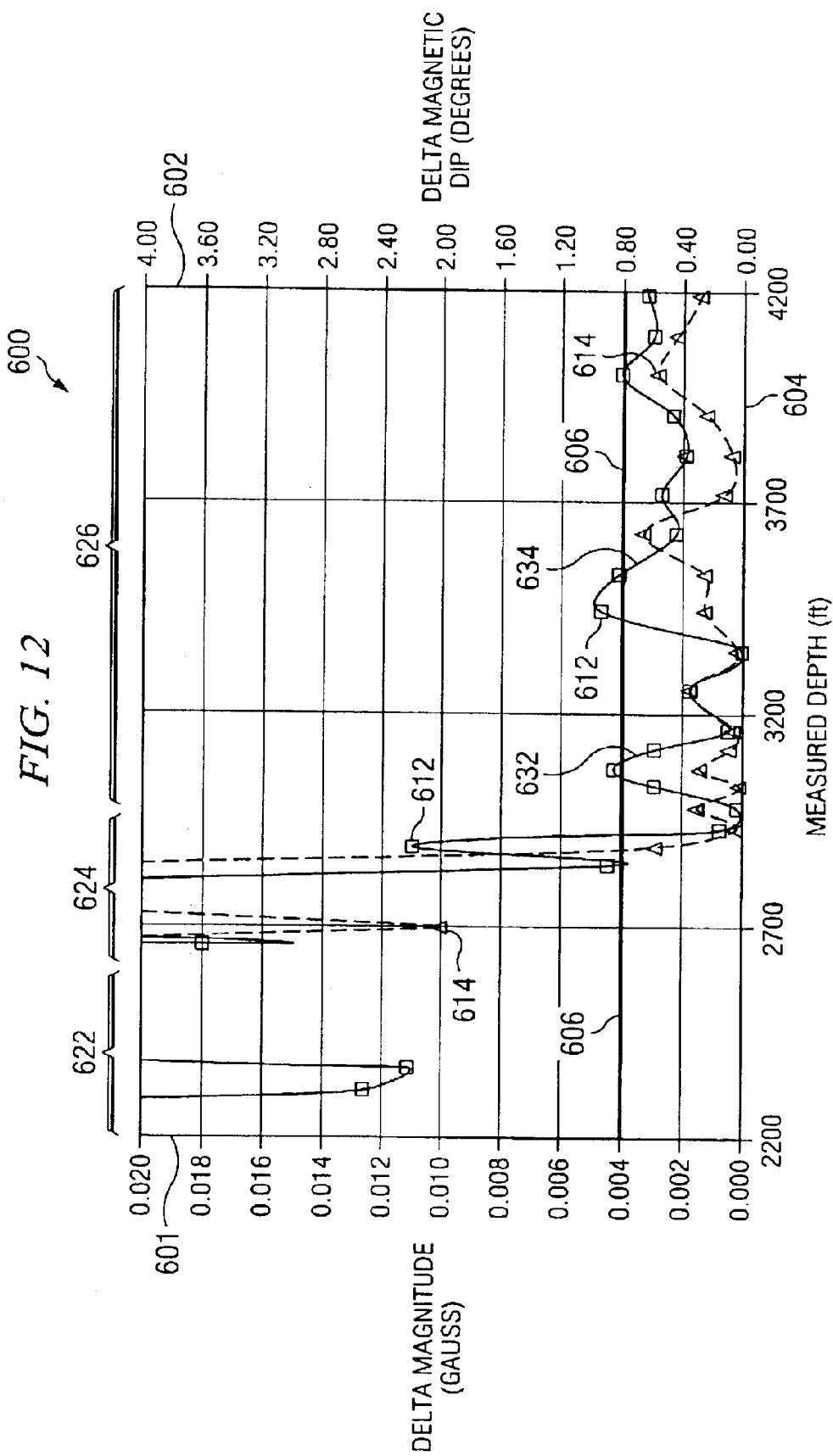
FIG. 12 is a graphical representation of the absolute value of delta magnitude and delta magnetic dip versus measured depth for the survey data shown in FIG. 7.

Referring now to FIGS. 12 through 14, exemplary methods of the present invention are discussed further by way of example, utilizing the exemplary survey described above with respects to FIGS. 7 and 8. Turning now to FIG. 12, a graphical representation 600 of the absolute value of the difference between the magnitude of the measured magnetic field and the magnitude of the earth's magnetic field on the first ordinate axis 601 and the absolute value of the difference between the magnetic dip of the measured magnetic field and the magnetic dip of the earth's magnetic field on the second ordinate axis 602 versus well depth on the abscissa axis 604 is shown. FIG. 12 is analogous to a plot of magnetic interference versus well depth. The difference in magnitude (delta magnitude) is shown at 612, while the difference in magnetic dip (delta magnetic dip) is shown at 614. As described above with respect to FIG. 7, the upper sensor set remained in the casing of the previously surveyed borehole in region 622 (region 222 in FIG. 7), and hence the data in region 622 is not relevant to the passive ranging analysis of this example. As also described above with respect to FIG. 7, there was significant magnetic interference from the casing of the previously surveyed borehole in region 624 (region 224 in FIG. 7), while in region 626 (region 226 in FIG. 7) the magnetic interference had decreased sufficiently for the magnetometer data to be useful in the supplemental referencing method described above. An exemplary interference magnetic field threshold is shown at 606. While the magnetic interference in region 626 was for the most part sufficiently low for supplemental referencing to be particularly efficacious, it was also sufficiently high at many of the survey points to be very useful in practicing the passive ranging aspects of the present invention. For example, the peak in delta magnitude at 632 was the result of magnetic interference from the previously surveyed borehole. The peak in the delta magnitude at 634, however, as shown below, was the result of magnetic interference from another borehole.

Referring now to FIG. 13, an exemplary two-dimensional view 700 (similar to that of FIG. 10) looking down the target borehole 704 (the previously surveyed borehole in FIG. 7) is shown. This two-dimensional view, as described above with respect to FIG. 10, is substantially orthogonal to the target borehole 704. The measured well (the well being drilled and surveyed) is shown at 702. Lines 721, 722, 723, 724, and 725 are extended from interference vectors derived at survey points 711, 712, 713, 714, and 715, respectively. Survey points 711 through 715 correspond to survey points 10 through 14, respectively, in Table 4 above. Thus the measured depths for survey points 711 through 715 were about 2743, 2791, 2844, 2885, and 2931 feet, respectively. Nine of the ten intersection points of lines 721 through 725 are shown at 730. The tenth intersection point (between lines 724 and 725) is off the FIGURE to the left and is thus is not shown. In this example, a "maximum distance limit" (as described above) was utilized and thus the tenth intersection point was not included in the analysis. The position of the target borehole 704 was taken as the mathematical average of the locations of the nine intersection points shown at 730. The distance and direction of each surveyed point (e.g., 711 through 715) to the target borehole 704 was determined from the two-dimensional view utilizing Equation 15. Similar two-dimensional views were generated in rolling fashion, utilizing five survey points for each view, along the surveyed borehole beginning at a measured depth of about 2548 feet (survey point 6 in Table 4) and culminating at a measured depth of about 3910 feet (survey point 27 in Table 4). In such manner the relative position of other boreholes was determined as a function of the measured depth of the surveyed borehole.

Referring now to FIG. 14, a graphical representation 800 of the distance from the borehole being drilled (the measured borehole) to the source of magnetic interference on the ordinate axis 802 versus the measured depth of the surveyed borehole on the abscissa axis 804 is shown. The distance to the previously surveyed borehole is shown at 810. As described above the measured borehole was formed by kicking off out of a casing window from the previously surveyed borehole at a measured depth of about 2500 feet. The distance from the measured borehole to the previously surveyed borehole quickly increased, as shown at 812, from the first passive ranging point at a measured depth of about 2548 feet to about 2697 feet. As drilling progressed, the measured borehole turned back towards the previously surveyed borehole, as shown at 814, passing by at a distance of about 5 feet at a measured well depth of 2885 feet (shown also at 714 in FIG. 13). The measured borehole then quickly moved away from the previously surveyed borehole at measured depths of greater than about 3000 feet, as shown at 816 and 832, which is consistent with the previous survey data shown in FIG. 7. At a measured well depth of about 3200 feet the measured borehole approached and passed by a second borehole at a distance of about 60 to 80 feet as shown at 820, which was independently verified from previous survey data of the second borehole.

While passive ranging requires only a single magnetometer set (e.g., located at the upper sensor set as in the above example), it will be appreciated that passive ranging may be further enhanced via the use of a second set of magnetometers (i.e., a first set of magnetometers at the upper sensor set and a second set of magnetometers at the lower sensor set). The use of two sets of magnetometers, along with the associated accelerometers, typically improves data density (i.e., more survey points per unit length of the measured well), reduces the time required to gather passive ranging vector data, increases the quality assurance of the generated data, and builds in redundancy.

The improvements disclosed herein related to supplemental referencing and passive ranging may also be used in conjunction with systems and methods disclosed in U.S. Pat. No. 6,321,456, which discloses a method for determining azimuth values in regions of high magnetic interference. For example, azimuth values as determined by the method of the '456 patent may be used as a supplemental reference azimuth for the gravity surveys as described above. Alternatively, such azimuth values may be utilized in the passive ranging calculations described above or to check the quality of the gravity surveys (such as in regions where chain referencing is required and the azimuthal data may be suspect).

It will be understood that the aspects and features of the present invention may be embodied as logic that may be processed by, for example, a computer, a microprocessor, hardware, firmware, programmable circuitry, or any other processing device well known in the art. Similarly the logic may be embodied on software suitable to be executed by a processor, as is also well known in the art. The invention is not limited in this regard. The software, firmware, and/or processing device may be included, for example, on a down hole assembly in the form of a circuit board, on board a sensor sub, or MWD/LWD sub. Alternatively the processing system may be at the surface and configured to process data sent to the surface by sensor sets via a telemetry or data link system also well known in the art. Electronic information such as logic, software, or measured or processed data may be stored in memory (volatile or non-volatile), or on conventional electronic data storage devices such as are well known in the art The sensors and sensor sets referred to herein, such as accelerometers, magnetometers and gyroscopes, are presently preferred to be chosen from among commercially available sensor devices that are well known in the art. Suitable accelerometer packages for use in service as disclosed herein include, for example, Part Number 979-0273-001 commercially available from Honeywell, and Part Number JA-5H175-1 commercially available from Japan Aviation Electronics Industry, Ltd. (JAE). Suitable magnetometer packages are commercially available called out by name from MicroTesla, Ltd., or under the brand name Tensor (™) by Reuter Stokes, Inc. It will be understood that the foregoing commercial sensor packages are identified by way of example only, and that the invention is not limited to any particular deployment of commercially available sensors.

Although the present invention and its advantages have been described in detail, it should be understood that various changes, substitutions and alternations can be made herein without departing from the spirit and scope of the invention as defined by the appended claims.

I claim:

1. A method for determining the location of a target subterranean structure from within an adjacent borehole, said subterranean structure generating magnetic flux, the method comprising:

(a) providing a downhole tool including first and second gravity measurement devices and first and second magnetic field measurement devices disposed at corresponding first and second positions in the borehole, the first and second positions selected to be within sensory range of magnetic flux from the subterranean structure, the first and second gravity measurement devices constrained from rotating with respect to one another about a substantially cylindrical borehole axis;

(b) measuring first and second gravity vector sets using the first and second gravity measurement devices, respectively;

(c) processing the first and second gravity vector sets to determine a local borehole azimuth;

(d) measuring a total local magnetic field at each of the first and second positions using the first and second magnetic field measurement devices;

(e) processing the total local magnetic field, the local azimuth and a reference magnetic field to determine a portion of the total magnetic field attributable to the target subterranean structure at each of the first and second positions;

(f) re-positioning the tool at new locus for first and second positions in the borehole so that the first and second magnetic field measurement devices remains within sensory range of the magnetic flux from the subterranean structure;

(g) repeating (b), (c), (d), (e), and (f) for a predetermined number of cycles;

(h) generating first and second interference magnetic field vectors for each locus for first and second positions, each of the interference magnetic field vectors corresponding to the portion of the total magnetic field determined in (e) at the corresponding locus; and (j) extending the interference magnetic field vectors to determine a location of the target subterranean structure.

2. The method of claim 1, wherein the subterranean structure is a borehole.

3. The method of claim 1, wherein the subterranean structure is a cased borehole.

4. The method of claim 1, wherein the tool further includes a gyroscope disposed at one of the first and second positions.

5. The method of claim 1, wherein each of the gravity vector sets in (b) comprises first and second gravity vectors.

6. The method of claim 5, wherein (b) further comprises deriving a third gravity vector for each of the gravity vector sets, each third gravity vector derived from processing the corresponding first and second gravity vectors and a known total gravitational field of the Earth.

7. The method of claim 1, wherein each of the gravity vector sets in (b) comprises first, second, and third gravity vectors.

8. The method of claim 1, wherein (c) further comprises determining the local borehole azimuth according to the equation:

$$BoreAzi = RefAzi + DeltaAzi$$

wherein BoreAzi is the local borehole azimuth, RefAzi is a reference borehole azimuth, and DeltaAzi is a change in azimuth between the first and second gravity measurement devices.

9. The method of claim 8, wherein the local borehole azimuth is determined at the second position and the reference borehole azimuth is determined at the first position.

10. The method of claim 8, wherein the reference borehole azimuth is referenced to a previously surveyed azimuthal reference point in the borehole.

11. The method of claim 10, wherein the reference borehole azimuths at each locus are chain referenced to the previously surveyed azimuthal reference point in the borehole.

12. The method of claim 8, wherein the reference borehole azimuth is determined with a supplemental reference measurement device disposed at one of the first and second positions on the downhole tool.

13. The method of claim 8, wherein the reference borehole azimuth is determined from the measured total local magnetic field.

14. The method of claim 13, wherein the reference borehole azimuth is determined according to the equation:

$$RefAzi = \arctan\left(\frac{(Gx*By - Gy*Bx)*\sqrt{Gx^2 + Gy^2 + Gz^2}}{Bz*(Gx^2 + Gy^2) - Gz*(Gx*Bx - Gy*By)}\right)$$

wherein RefAzi represents the reference borehole azimuth, Bx, By, and Bz represent first, second, and third magnetic field vectors, Gx, Gy, and Gz, represent first, second, and third gravity vectors measured at the same position as the first, second, and third magnetic field vectors.

15. The method of claim 8, wherein the reference borehole azimuth is determined from the total magnetic field when a difference between the total magnetic field and the reference magnetic field is less than a predetermined threshold.

16. The method of claim 15, wherein the reference borehole azimuth is determined from the total magnetic field when a difference between a magnitude of the total magnetic field and a magnitude of the reference magnetic field is less than the predetermined threshold.

17. The method of claim 15, wherein the reference borehole azimuth is determined based on the total magnetic field when a difference between a magnetic dip of the total magnetic field and a magnetic dip of the reference magnetic field is less than the predetermined threshold.

18. The method of claim 8, wherein the change in borehole azimuth is determined from the first and second gravity vector sets.

19. The method of claim 18, wherein the change in borehole azimuth is determined according to the equation:

$$DeltaAzi = \frac{Beta}{1 - \sin((Inc1 + Inc2)/2)}$$

wherein:

$$Beta = \arctan\left(\frac{(Gx2*Gy1 - Gy2*Gx1)*\sqrt{Gx1^2 + Gy1^2 + Gz1^2}}{Gz2*(Gx1^2 + Gy1^2) + Gz1*(Gx2*Gx1 + Gy2*Gy1)}\right);$$

$$Inc1 = \arctan\left(\frac{\sqrt{(Gx1^2 + Gy1^2)}}{Gz1}\right);$$

$$Inc2 = \arctan\left(\frac{\sqrt{(Gx2^2 + Gy2^2)}}{Gz2}\right); \text{ and}$$

wherein DeltaAzi represents the change in borehole azimuth, Bx1, By1, and Bz1 represent first, second, and third magnetic field vectors measured at the first position, Gx1, Gy1, and Gz1, represent first, second, and third gravity vectors measured at the first position, Gx2, Gy2, and Gz2, represent first, second, and third gravity vectors measured at the second position, and Inc1 and Inc2 represent inclination values at the first and second positions, respectively.

20. The method of claim 1, wherein (d) comprises measuring first and second magnetic field vectors.

21. The method of claim 20, wherein (d) further comprises deriving a third magnetic field vector based on the first and second magnetic field vectors and the reference magnetic field.

22. The method of claim 1, wherein (d) comprises measuring first, second, and third magnetic field vectors.

23. The method of claim 1, wherein the reference magnetic field is measured in substantially real time at a site substantially free of magnetic interference.

24. The method of claim 23, wherein the site is disposed in another borehole.

25. The method of claim 1, wherein the reference magnetic field is known based on a historical geological survey.

26. The method of claim 1, wherein the reference magnetic field is determined from on a numerical model.

27. The method of claim 1, wherein x, y, and z components of the reference magnetic field are determined according to the equations:

$$M_{EX}=H_E(\cos D \sin Az \cos R + \cos D \cos Az \cos Inc \sin R - \sin D \sin Inc \sin R)$$

$$M_{EY}=H_E(\cos D \cos Az \cos Inc \cos R + \sin D \sin Inc \cos R - \cos D \sin Az \sin R)$$

$$M_{EZ}=H_E(\sin D \cos Inc - \cos D \cos Az \sin Inc)$$

wherein Mex, Mey, and Mez represent the x, y, and z components of the reference magnetic field, respectively, He represents a magnitude of the reference magnetic field, D represents a magnetic dip of the reference magnetic field, Inc represents a local borehole inclination, Az represents the local borehole azimuth, and R represents a local rotation of the downhole tool.

28. The method of claim 1, wherein (e) comprises determining a difference between the total magnetic field and the reference magnetic field.

29. The method of claim 28, wherein:

x, y, and z components of the reference magnetic field are determined according to the equations:

$$M_{EX}=H_E(\cos D \sin Az \cos R + \cos D \cos Az \cos Inc \sin R - \sin D \sin Inc \sin R)$$

$$M_{EY}=H_E(\cos D \cos Az \cos Inc \cos R + \sin D \sin Inc \cos R - \cos D \sin Az \sin R)$$

$$M_{EZ}=H_E(\sin D \cos Inc - \cos D \cos Az \sin Inc)$$

wherein Mex, Mey, and Mez represent the x, y, and z components of the reference magnetic field, respectively, He represents a magnitude of the reference magnetic field, D represents a magnetic dip of the reference magnetic field, Inc represents a local borehole inclination, Az represents the local borehole azimuth, and R represents a local rotation of the downhole tool; and the portion of the total magnetic field attributable to the subterranean structure is determined according to the equations:

$$M_{IX}=B_X-M_{EX}$$

$$M_{IY}=B_Y-M_{EY}$$

$$M_{IZ}=B_Z-M_{EZ}$$

wherein Mix, Miy, and Miz represent x, y, and z components, respectively, of the portion of the total magnetic field attributable to the subterranean structure, and Bx, By, and Bz represent x, y, and z components of the total magnetic field, respectively.

30. The method of claim 28, wherein (e) further comprises subtracting another magnetic field component from the difference between the total magnetic field and the reference magnetic field.

31. The method of claim 1, wherein (i) further comprises:
projecting said extended interference magnetic field vectors onto a two-dimensional view;
determining intersection points in the two-dimensional view at which the interference magnetic field vectors intersect one another; and
determining a two-dimensional viewing plane at which a distance between the intersection points is substantially at a minimum.

32. The method of claim 31, wherein a location of a target subterranean structure is determined by determining an average position of a plurality of the intersection points in the two-dimensional viewing plane.

33. The method of claim 31, wherein a distance from a predetermined point on the borehole to the target subterranean structure may be determined according to the equation:

$$D=\sqrt{(x_{T-x})^2+(y_{T-y})^2}$$

wherein D represents the distance, $x_T$ and $y_T$ represent x and y coordinates, respectively, in the two-dimensional viewing plane of the location of the target subterranean structure, and x and y represent the x and y coordinates, respectively, in the two-dimensional viewing plane of the predetermined point on the borehole.

34. The method of claim 31, wherein a direction from a predetermined point on the borehole to the target subterranean structure may be determined according to the equation:

$$R = \arctan\left(\frac{(x_T - x)}{(y_T - y)}\right)$$

wherein R represents the direction, $x_T$ and $y_T$ represent x and y coordinates, respectively, in the two-dimensional viewing plane of the location of the target subterranean structure, and x and y represent the x and y coordinates, respectively, in the two-dimensional viewing plane of the predetermined point on the borehole.

35. The method of claim 31, wherein a target azimuth and a target inclination of the target subterranean structure are determined from the two-dimensional viewing plane.

36. The method of claim 31, wherein the two-dimensional viewing plane is determined graphically.

37. The method of claim 31, further comprising:
transposing the interference magnetic field vectors into azimuth, magnetic dip, and magnitude components;
rotating the interference magnetic field vectors by adding angle increments to the azimuth component thereof;
rotating the interference magnetic field vectors by adding angle increments to the magnetic dip component thereof; and
projecting the interference magnetic field vectors onto a two-dimensional view at each of said angle increments.

38. A system for determining the location of a target subterranean structure from within an adjacent borehole, said subterranean structure generating magnetic flux, the system comprising:
a down hole tool including first and second gravity measurement devices and first and second magnetic field measurement devices deployed thereon, the tool operable to be positioned in a borehole such that the first and second gravity measurement devices and the first and second magnetic field measurement devices are located at a preselected series of corresponding first and second positions in the borehole, each first and second position in the series corresponding to a predetermined locus of the tool in the borehole, at least one of the first and second positions selected to be within sensory range of magnetic flux from the subterranean structure at each locus, the magnetic field measurement devices disposed within sensory range of magnetic flux from the subterranean structure at each locus, the first and second gravity measurement devices constrained from rotating with respect to one another about a substantially cylindrical borehole axis; and
a processor configured to determine:
(A) first and second sets of gravity vectors from measurements of the first and second gravity measurement devices, respectively, at the first and second positions, respectively, at each locus;
(B) a local borehole azimuth at each locus from the first and second gravity vector sets in (A);
(C) total local magnetic fields at the first and second positions for each locus as measured by the magnetic field measurement devices;
(D) a portion of the total magnetic field attributable to the subterranean structure at each locus, said portion determined from the total local magnetic field in (C), the local azimuth in (B), and a reference magnetic field made available to the processor;
(E) interference magnetic field vectors for each locus, each of the interference magnetic field vectors corresponding to the portion of the total magnetic field determined in (D) at the corresponding locus; and
(F) a location of the target subterranean structure based on extension of the interference magnetic field vectors determined in (E).

39. The system of claim 38, wherein:
each of the gravity measurement devices comprises first, second, and third accelerometers; and
each of the magnetic field measurement device comprises first, second, and third magnetometers.

40. The system of claim 38, wherein the tool further comprises a gyroscope disposed at one of the first and second positions.

41. A computer system comprising:
at least one processor; and
a storage device having computer-readable logic stored therein, the computer-readable logic accessible by and intelligible to the processor;
the processor further disposed to receive input from first and second gravity measurement devices when said first and second gravity measurement devices are deployed on a down hole tool at a preselected series of corresponding first and second positions in a borehole, each first and second position in the series corresponding to a predetermined locus of the tool in the borehole, the first and second positions selected to be within sensory range, at each locus, of magnetic flux generated by a target subterranean structure located outside the borehole, the first and second gravity measurement devices constrained, when deployed on the tool, from rotating with respect to one another about a substantially cylindrical borehole axis,
the processor further disposed to receive input from first and second magnetic field measurement devices deployed on the tool at the corresponding first and second positions and within sensory range at each locus of magnetic flux from the subterranean structure,
the computer-readable logic further configured to instruct the processor to execute a method for determining the location of the target subterranean structure, the method comprising:

(a) determining first and second sets of gravity vectors based on input from the first and second gravity measurement devices, respectively, at the first and second positions, respectively, at each locus;

(b) calculating a local borehole azimuth at each locus from the first and second gravity vector sets determined in (a);

(c) determining a total local magnetic field for each locus based on input from the magnetic field measurement devices;

(d) determining a portion of the total magnetic field attributable to the subterranean structure at each locus, said portion determined from the total local magnetic field in (c), the local azimuth in (b), and a reference magnetic field made available to the processor;

(e) calculating interference magnetic field vectors for each locus, each of the interference magnetic field vectors corresponding to the portion of the total magnetic field determined in (d) at the corresponding locus; and (f) determining a location of the target subterranean structure based on extension of the interference magnetic field vectors determined in (e).

42. The computer system of claim 41, wherein (b) further comprises determining a local borehole azimuth according to the equation:

$$BoreAzi = RefAzi + DeltaAzi$$

wherein BoreAzi is the local borehole azimuth, RefAzi is a reference borehole azimuth, and DeltaAzi is a change in azimuth between the first and second gravity measurement devices.

43. The computer system of claim 42, wherein the reference borehole azimuth is determined according to the equation:

$$RefAzi = \arctan\left(\frac{(Gx * By - Gy * Bx) * \sqrt{Gx^2 + Gy^2 + Gz^2}}{Bz * (Gx^2 + Gy^2) - Gz * (Gx * Bx - Gy * By)}\right)$$

wherein RefAzi represents the reference borehole azimuth, Bx, By, and Bz represent first, second, and third magnetic field vectors, Gx, Gy, and Gz, represent first, second, and third gravity vectors measured at the same position as the first, second, and third magnetic field vectors.

44. The computer system of claim 43, wherein the change in borehole azimuth is determined according to the equation:

$$DeltaAzi = \frac{Beta}{1 - \operatorname{Sin}((Inc1 + Inc2)/2)}$$

wherein:

$$Beta = \arctan\left(\frac{(Gx2 * Gy1 - Gy2 * Gx1) * \sqrt{Gx1^2 + Gy1^2 + Gz1^2}}{Gz2 * (Gx1^2 + Gy1^2) + Gz1 * (Gx2 * Gx1 + Gy2 * Gy1)}\right);$$

$$Inc1 = \arctan\left(\frac{\sqrt{Gx1^2 + Gy1^2}}{Gz1}\right);$$

$$Inc2 = \arctan\left(\frac{\sqrt{Gx2^2 + Gy2^2}}{Gz2}\right); \text{ and}$$

wherein DeltaAzi represents the change in borehole azimuth, Bx1, By1, and Bz1 represent first, second, and third magnetic field vectors measured at the first position, Gx1, Gy1, and Gz1, represent first, second, and third gravity vectors measured at the first position, Gx2, Gy2, and Gz2, represent first, second, and third gravity vectors measured at the second position, and Inc1 and Inc2 represent inclination values at the first and second positions, respectively.

45. The computer system of claim 41, wherein the portion of the total magnetic field attributable to the subterranean structure at each locus in (d) is determined by the equations:

$$M_{IX} = B_X - M_{EX}$$

$$M_{IY} = B_Y - M_{EY}$$

$$M_{IZ} = B_Z - M_{EZ}$$

wherein Mix, Miy, and Miz represent x, y, and z components, respectively, of the portion of the total magnetic field attributable to the subterranean structure, and Bx, By, and Bz represent x, y, and z components of the total magnetic field determined in (c), and Mex, Mey, and Mez represent the x, y, and z components of the reference magnetic field.

46. The computer system of claim 45, wherein the x, y, and z components of the reference magnetic field are determined by the equations:

$$M_{EX} = H_E(\cos D \sin Az \cos R + \cos D \cos Az \cos Inc \sin R - \sin D \sin Inc \sin R)$$

$$M_{EY} = H_E(\cos D \cos Az \cos Inc \cos R + \sin D \sin Inc \cos R - \cos D \sin Az \sin R)$$

$$M_{EZ} = H_E(\sin D \cos Inc - \cos D \cos Az \sin Inc)$$

wherein He represents a magnitude of the reference magnetic field, D represents a magnetic dip of the reference magnetic field, Inc represents a local borehole inclination, Az represents the local borehole azimuth determined in (b), and R represents a local rotation of the downhole tool.

47. A method for determining the location of a target subterranean structure from within an adjacent borehole, said subterranean structure generating magnetic flux, the method comprising:

(a) providing a downhole tool including first and second gravity measurement devices deployed at a preselected series of corresponding first and second positions in a borehole, each first and second position in the series corresponding to a predetermined locus of the tool in the borehole, at least one of the first and second positions selected to be within sensory range, at each locus, of magnetic flux from the subterranean structure, the tool further including first and second magnetic field measurement devices disposed at the first and second positions and within sensory range of magnetic flux from the subterranean structure, the first and second gravity measurement devices constrained from rotating with respect to one another about a substantially cylindrical borehole axis;

(b) measuring first and second gravity vector sets at each using the first and second gravity measurement devices;

(c) processing the first and second gravity vector sets to determine a local borehole azimuth at each locus;
(d) measuring total local magnetic fields at each locus using the magnetic field measurement device;
(e) processing the total local magnetic fields, the local azimuth and a reference magnetic field to determine a portion of the total magnetic field attributable to the target subterranean structure at each locus;
(f) calculating interference magnetic fields vector for each locus, each of the interference magnetic field vectors corresponding to the portion of the total magnetic field determined in (e) at the corresponding locus; and
(g) extending the interference field vectors to determine a location of the target subterranean structure.

* * * * *